US012714970B2

(12) United States Patent
Fuglevand et al.

(10) Patent No.: US 12,714,970 B2
(45) Date of Patent: Aug. 25, 2026

(54) $CO_2$ SEPARATION SYSTEMS AND METHODS

(71) Applicant: CARBONQUEST, INC., Spokane Valley, WA (US)

(72) Inventors: William A. Fuglevand, Spokane Valley, WA (US); Shane Johnson, Rosalia, WA (US)

(73) Assignee: CARBONQUEST, INC., Spokane Valley, WA (US)

( * ) Notice: Subject to any disclaimer, the term of this patent is extended or adjusted under 35 U.S.C. 154(b) by 501 days.

(21) Appl. No.: 18/140,266

(22) Filed: Apr. 27, 2023

(65) Prior Publication Data

US 2023/0256388 A1 Aug. 17, 2023

Related U.S. Application Data

(63) Continuation-in-part of application No. PCT/US2022/022853, filed on Mar. 31, 2022, and a (Continued)

(51) Int. Cl.

*B01D 53/02* (2006.01)
*B01D 53/04* (2006.01)
*B01D 53/81* (2006.01)

(52) U.S. Cl.

CPC ............. *B01D 53/81* (2013.01); *B01D 53/04* (2013.01); *B01D 2256/10* (2013.01);

(Continued)

(58) Field of Classification Search

CPC .......... B01D 2053/224; B01D 2256/10; B01D 2257/504; B01D 2257/80;

(Continued)

(56) References Cited

U.S. PATENT DOCUMENTS 2,802,719 A 8/1957 Avedikian
4,283,212 A 8/1981 Graham et al.

(Continued)

FOREIGN PATENT DOCUMENTS

CA 2634256 7/2007
CA 2362773 12/2009

(Continued)

OTHER PUBLICATIONS

EP EP-23747690 Ext. Search Rpt., Aug. 25, 2025, Carbonquest, Inc.

(Continued)

*Primary Examiner* — Christopher P Jones
(74) *Attorney, Agent, or Firm* — Wells St. John P.S.

(57) ABSTRACT

Combustion systems are provided that can include a combustion assembly operatively engaged with an air intake, wherein the air intake performs air enrichment.

Methods for enriching air to a combustion assembly are also provided. The methods can include: forming an $N_2$-rich stream and an $O_2$-rich stream from a first air stream; supplementing a second air stream with the $O_2$-rich stream to enrich the second air stream with $O_2$; and combusting the enriched air stream.

Systems for separating $CO_2$ from flue gas are also provided. The systems can include a vortex tube assembly operably coupled to a component of the system that provides pressurized $N_2$.

Methods for heating or cooling components of a system for separating $CO_2$ from flue gas are also provided. The methods can include: providing compressed nitrogen from one or more components of the system to a vortex tube to form a heated nitrogen stream and cooled nitrogen stream; providing the heated nitrogen stream to components benefiting from a heat source; and providing the cooled nitrogen stream to components benefiting from a cooling source.

(Continued)

Systems for separating $CO_2$ from flue gas can also include a separation assembly that includes a membrane assembly configured to separate $CO_2$ from $N_2$.
Methods for separating $CO_2$ from flue gas can also include providing a flue gas stream comprising $CO_2$ and $N_2$ to a first membrane separation system to form a $CO_2$-rich stream and an $N_2$-rich stream.

7 Claims, 30 Drawing Sheets

Related U.S. Application Data continuation-in-part of application No. PCT/US2021/057111, filed on Oct. 28, 2021.

(60) Provisional application No. 63/168,794, filed on Mar. 31, 2021, provisional application No. 63/168,825, filed on Mar. 31, 2021, provisional application No. 63/106,759, filed on Oct. 28, 2020, provisional application No. 63/106,862, filed on Oct. 28, 2020, provisional application No. 63/106,729, filed on Oct. 28, 2020.

(52) U.S. Cl.
CPC .... *B01D 2257/504* (2013.01); *B01D 2317/02* (2013.01); *B01D 2317/06* (2013.01)

(58) Field of Classification Search
CPC ........ B01D 2258/0283; B01D 2317/02; B01D 2317/06; B01D 53/04; B01D 53/047; B01D 53/226; B01D 53/326; B01D 53/62; B01D 53/81
See application file for complete search history.

(56) References Cited

U.S. PATENT DOCUMENTS 4,284,055 A 8/1981 Wakeman
4,391,227 A 7/1983 Forster et al.
4,484,933 A 11/1984 Cohen
4,823,710 A 4/1989 Garrido et al.
5,203,159 A 4/1993 Koizumi et al.
5,536,893 A 7/1996 Gudmundsson
6,170,264 B1 1/2001 Viteri et al.
7,056,482 B2 6/2006 Hakka et al.
7,594,956 B2 9/2009 Knaebel
7,727,374 B2 6/2010 Jones
8,226,917 B2 7/2012 Fan et al.
8,353,978 B2 1/2013 Knaebel
8,413,420 B1 4/2013 Zaromb
8,460,630 B2 * 6/2013 Niitsuma ............ B01D 53/229 423/652
8,741,244 B2 6/2014 Jones
8,784,534 B2 7/2014 Kamakoti et al.
9,637,393 B2 5/2017 Heidel et al.
9,782,718 B1 * 10/2017 Baker .................. B01D 53/22
10,099,176 B2 10/2018 Ateya Soliman
10,596,512 B2 3/2020 Mansour et al.
10,676,799 B2 6/2020 Berlowitz et al.
10,718,055 B2 7/2020 Ren et al.
2002/0166323 A1 11/2002 Marin et al.
2004/0231332 A1 11/2004 Saucedo et al.
2005/0045030 A1 3/2005 Tonkovich et al.
2005/0199231 A1 9/2005 Heider
2005/0229871 A1 10/2005 Robertson
2006/0099110 A1 5/2006 Shirakura
2008/0121105 A1 5/2008 Schubert et al.
2008/0302133 A1 12/2008 Saysset et al.
2009/0214407 A1 8/2009 Reyes et al.
2009/0241490 A1 10/2009 Lack
2010/0083697 A1 4/2010 Degenstein et al.
2010/0180889 A1 7/2010 Monzyk et al.
2010/0198736 A1 8/2010 Marino
2010/0212555 A1 8/2010 Yamada et al.
2010/0288172 A1 11/2010 Jukkola et al.
2011/0005272 A1 * 1/2011 Wijmans ............. B01D 53/225 62/617
2011/0182797 A1 * 7/2011 Wilcox ............. B01D 71/0223 95/47
2011/0195473 A1 8/2011 Wilhelm
2011/0203569 A1 8/2011 Weimer
2011/0219949 A1 * 9/2011 Wijmans ............... F23J 15/006 62/617
2011/0260112 A1 * 10/2011 Wijmans ............... F23J 15/006 252/372
2011/0293503 A1 12/2011 Wright et al.
2012/0060689 A1 3/2012 Naumovitz et al.
2012/0227644 A1 9/2012 Uchida et al.
2012/0285162 A1 11/2012 Ahn et al.
2013/0202517 A1 8/2013 Ayala et al.
2013/0247886 A1 9/2013 Hamad et al.
2013/0283852 A1 10/2013 Sipocz et al.
2013/0323657 A1 12/2013 Ludwing et al.
2014/0041562 A1 2/2014 Grubbstrom
2014/0089078 A1 3/2014 Dessert et al.
2014/0116358 A1 5/2014 Stallmann
2014/0194539 A1 7/2014 Hammad et al.
2014/0261245 A1 9/2014 Patrick et al.
2014/0287235 A1 9/2014 Chang et al.
2014/0298996 A1 10/2014 Meirav et al.
2015/0047989 A1 2/2015 Huang
2015/0079526 A1 3/2015 Lou et al.
2015/0136316 A1 5/2015 Chen et al.
2015/0190748 A1 7/2015 Liu et al.
2015/0329369 A1 11/2015 Heidel et al.
2015/0360168 A1 12/2015 Zubrin et al.
2016/0305655 A1 10/2016 Tulokas
2016/0356489 A1 12/2016 Matsumoto et al.
2016/0363368 A1 12/2016 Zanganeh et al.
2017/0003246 A1 1/2017 Shuk et al.
2017/0138222 A1 5/2017 Sundaram et al.
2017/0183996 A1 * 6/2017 Baker ...................... F01K 5/00
2017/0271701 A1 9/2017 Berlowitz et al.
2017/0341942 A1 11/2017 Harper, Jr.
2018/0104668 A1 4/2018 Tan et al.
2020/0009494 A1 1/2020 Ritter et al.
2020/0027096 A1 1/2020 Cooner
2020/0148038 A1 5/2020 Kujak et al.
2020/0203738 A1 6/2020 Jolly et al.
2020/0340665 A1 10/2020 Fuglevand et al.
2020/0346165 A1 * 11/2020 Lu .......................... C01B 32/55
2021/0048835 A1 2/2021 Brown
2021/0116144 A1 4/2021 Morgan et al.
2021/0117824 A1 4/2021 Azmandian et al.
2021/0325064 A1 10/2021 Amhamed et al.
2022/0011731 A1 1/2022 Risbeck et al.
2022/0168686 A1 * 6/2022 Chinn ................. C10G 11/182
2022/0358515 A1 11/2022 Kahn et al.
2022/0390137 A1 12/2022 Wenzel et al.
2023/0107337 A1 4/2023 Toroman et al.
2023/0125924 A1 4/2023 Nawaz et al.
2023/0175686 A1 6/2023 Fuglevand et al.
2023/0201757 A1 6/2023 Alissa et al.
2023/0265794 A1 8/2023 Callahan

FOREIGN PATENT DOCUMENTS

CA 2559081 12/2012
CA 3022534 2/2017
CN 201507941 6/2010
CN 106025313 10/2016
CN 107355680 11/2017
DK 2615264 8/2016
EP 2950911 12/2015
JP H04-359785 12/1992
JP H0699034 4/1994
JP 2000-317302 A 11/2000
JP 2006-347847 12/2006

(56) References Cited

FOREIGN PATENT DOCUMENTS

| | | |
|---|---|---|
| JP | 2011-247533 | 12/2011 |
| KR | 10-1038439 | 6/2011 |
| KR | 2013-0047109 | 5/2013 |
| WO | WO 02/09849 | 2/2002 |
| WO | WO 2009/070785 | 6/2009 |
| WO | WO 2010/068924 | 6/2010 |
| WO | WO 2010/139903 | 12/2010 |
| WO | WO 2014/127913 | 8/2014 |
| WO | WO 2014/207035 | 12/2014 |
| WO | WO 2016/205303 | 12/2016 |
| WO | WO 2017/003715 | 1/2017 |
| WO | WO 2017/116307 | 7/2017 |
| WO | WO 2017/163549 | 9/2017 |
| WO | WO 2017/189238 | 11/2017 |
| WO | WO 2020/219907 | 10/2020 |
| WO | WO 2021/096958 | 5/2021 |
| WO | WO 2021/156457 | 8/2021 |
| WO | WO 2022/087265 | 4/2022 |
| WO | WO 2022/094124 | 5/2022 |
| WO | WO 2022/212719 | 10/2022 |
| WO | WO 2022/266377 | 12/2022 |
| WO | WO 2023/212246 | 11/2023 |

OTHER PUBLICATIONS

Rainer Küngas et al., "Review-Electrochemical CO2 Reduction for CO Production: Comparison of Low- and High-Temperature Electrolysis Technologies", J. Eletrochem. Soc 167, 2020, 044508, United States, 12 pages.
Wu et al., "Catalytic conversion of CO2 to value added fues: Current Status, challenges, and future directions" Chinese Journal of Catalysis vol. 37, Jul. 2016, China, pp. 999-1015.
WO PCT/US2020/030533 IPRP, Nov. 11, 2021, Nextwatts, Inc.
WO PCT/US2020/030533 Search Rprt., Sep. 11, 2020, Nextwatts, Inc.
WO PCT/US2020/030533 Writ. Opin., Sep. 11, 2020, Nextwatts, Inc.
WO PCT/US2021/057111 Search Rprt., Mar. 1, 2022, Nextwatts, Inc.
WO PCT/US2021/057111 Writ. Opin., Mar. 1, 2022, Nextwatts, Inc.
WO PCT/US2022/022853 Inv. Pay Fee, May 24, 2022, Carbonquest, Inc.
WO PCT/US2022/022853 Search Rprt., Jul. 29, 2022, Carbonquest, Inc.
WO PCT/US2022/022853 Writ Opin., Jul. 29, 2022, Carbonquest, Inc.
WO PCT/US2022/033871 Inv. Pay Fee, Sep. 7, 2022, Carbonquest, Inc.
WO PCT/US2022/033871 Search Rpt., Nov. 7, 2022, Carbonquest, Inc.
WO PCT/US2022/033871 Writ. Opin., Nov. 7, 2022, Carbonquest, Inc.
WO PCT/US2023/011863 Search Rpt., Apr. 14, 2023, Carbonquest, Inc.
WO PCT/US2023/011863 Writ. Opin., Apr. 14, 2023, Carbonquest, Inc.
ASCO, "CO2 Production Plants", available online at https://www.ascoco2.com/fileadmin/PDF_Download/PDF_Produkte/PDF_CO2_Produktion_und_Rueckgewinnung/en/ASCO_CO2_Production_Plants.pdf, Oct. 2017, 4 pages.
ASCO, "CO2 Stack Gas Recovery Systems", available online at https://www.ascoco2.com/fileadmin/PDF_Download/PDF_Produkte/PDF_CO2_Produktion_und_Rueckgewinnung/en/ASCO_CO2_Stack_Gas_Recovery_Systems.pdf, Aug. 2018, 4 pages.
ASCO, "CO2 Storage and Transport", available online at https://www.ascoco2.com/en/co2-and-dry-ice-equipment/co2-storage/, Mar. 12, 2019, 5 pages.
ASCO, "CO2: Industrial Gases", available online at https://www.ascoco2.com/en/co2-production-and-co2-recovery-plants/industries/industrial-gases/, Mar. 12, 2019, 4 pages.
Fluor, "Carbon Capture Recovery Technologies for Flue Gas Streams Reduce Greenhouse Gas Emissions", available online at https://www.fluor.com/client-markets/energy-chemicals/carbon-capture, Mar. 12, 2019, 2 pages.
Fluor, "Econamine FG Plus", available online at https:// www.fluor.com /about-fluor/corporate-information/technologies/fluor-econamine-fg-plus, Mar. 12, 2019, 2 pages.
Global CCS Institute, "Liquid CO2 Collection Network", available online at https://hub.globalccsinstitute.com/publications/co2-liquid-logistics-shipping-concept-llsc-overall-supply-chain-optimization/52-liquid, Mar. 14, 2019, 4 pages.
Poola et al., "Study of Using Oxygen-Enriched Combustion Air for Locomotive Diesel Engines", CONF-961017-7, available online at https://digital.library.unt.edu/ark:/67531/metadc674816/m2/1/high_res_d/392758.pdf, 1996, 13 pages.
Qnergy, "Power Conversion Kit: PCK80", available online at https://www.qnergy.com/wp-content/uploads/2017/12/Download-the-PCK80-Brochure-Spec-Sheet.pdf, 2017, 2 pages.
Rinprasertmeechai et al., "Carbon Dioxide Removal from Flue Gas Using Amine-Based Hybrid Solvent Absorption", International Journal of Chemical and Molecular Engineering vol. 6, No. 4, 2012, United States, pp. 284-288.
EP EP 22782222 Partial Srch Rpt., Apr. 25, 2025, Carbonquest, Inc.
JP JP-H0699034 Cert. Translation, Apr. 12, 1994, Kuroda et al.
WO PCT/US23/018080 IPRP, Apr. 24, 2025, Carbonquest, Inc.
WO PCT/US24/056728 Search Rept., Feb. 25, 2025, Carbonquest, Inc.
WO PCT/US24/056728 Writ. Opin., Feb. 25, 2025, Carbonquest, Inc.
WO PCT/US25/020362 Invit. Pay Fee, May 9, 2025, Carbonquest, Inc.
WO WO2017/163549 Certified Trans, Sep. 28, 2017, Naito.
Qazvini et al., "MUF-16: A Robust Metal-Organic Framework for Pre- and Post-Combustion Carbon Dioxide Capture", ACS Applied Materials & Interfaces, vol. 13, Mar. 4, 2021, pp. 12141-12148.
WO PCT/US2024/027659 Search Rpt, Sep. 11, 2024, Carbonquest, Inc.
WO PCT/US2024/027659 Writ. Opin., Sep. 11, 2024, Carbonquest, Inc.
EP EP 21887548 Extend. Search Rpt, Jan. 8, 2025, Carbonquest, Inc.
WO PCT/US24/056728 Invit. Pay Fees, Jan. 3, 2025, Carbonquest, Inc.
WO PCT/US2023/011863 IPRP, Aug. 15, 2024, Carbonquest, Inc.
WO PCT/US2024/025729 Search Rpt, Aug. 27, 2024, Carbonquest, Inc.
WO PCT/US2024/025729 Writ.Opin., Aug. 27, 2024, Carbonquest, Inc.
WO PCT/US2024/037666 Inv Pay Fees, Sep. 3, 2024, Carbonquest, Inc.
WO PCT/US25/020362 Search Rept, Jul. 18, 2025, Carbonquest, Inc.
WO PCT/US25/020362 Written Opin., Jul. 18, 2025, Carbonquest, Inc.
EP 20798450 Supp. Search Rept, May 17, 2023, Carbonquest, Inc.
WO PCT/US2021/057111 IPRP, May 11, 2023, Carbonquest, Inc.
WO PCT/US2023/018080 Inv.PayFees, Jun. 2, 2023, Carbonquest, Inc.
WO PCt/US2023/018080 Search Rpt, Aug. 15, 2023, Carbonquest, Inc.
WO PCT/US2023/018080 Writ. Opin., Aug. 15, 2023, Carbonquest, Inc.
WO PCT/US2023/020278 Search Rpt, Jul. 21, 2023, Carbonquest, Inc.
WO PCT/US2023/020278 Written Opin, Jul. 21, 2023, Carbonquest, Inc.
WO PCT/US2022/033871 IPRP, Dec. 28, 2023, Carbonquest, Inc.
WO PCT/US2024/027659 Inv Pay Fees, Jul. 1, 2024, Carbonquest, Inc.
WO PCT/US2022/022853 IPRP, Oct. 12, 2023, Carbonquest, Inc.

(56) References Cited

OTHER PUBLICATIONS

WO PCT/US2023/020278 IPRP, Nov. 7, 2024, Carbonquest, Inc.
WO PCT/US2024/037666 Search Rpt., Sep. 11, 2024, Carbonquest, Inc.
WO PCT/US2024/037666 Writ. Opin., Oct. 24, 2024, Carbonquest, Inc.
EP EP 22782222 Extend. Srch. Rpt., Jul. 16, 2025, Carbonquest, Inc.
EP EP 22825861 Extend. Search Rpt, Sep. 18, 2025, Carbonquest, Inc.
WO PCT/US2024/025729 IPRP, Nov. 6, 2025, Carbonquest, Inc.
WO PCT/US2024/027659 IPRP, Nov. 13, 2025, Carbonquest, Inc.
WO PCT/US2024/037666 IPRP, Jan. 22, 2026, Carbonquest, Inc.
WO PCT/US25/056592 Search Rept., Feb. 13, 2026, Carbonquest, Inc.
WO PCT/US25/056592 Written Opin., Feb. 13, 2026, Carbonquest, Inc.
Dolphin et al., "Stock Embeddings: Representation Learning for Financial Time Series" MDPI Eng. Proc., Jun. 29, 2023, 39, 30, https://doi.org/10.3390/engproc2023039030, Switzerland, 10 pages.
Gao et al., "Synthesis of Microporous Nitrogen-Rich Covalent-Organic Framework and Its Application in CO2 Capture", Chin. J. Chem. 2015, vol. 33, Nov. 3, 2014, United States, pp. 90-94.
McDonald et al., "Capture of Carbon Dioxide from Air and Flue Gas in the Alkylamine-Appended Metal-Organic Framwork mmen-Mg2(dobpdc)", J. Am. Chem. Soc. 2012, 134, Apr. 25, 2012, United States, pp. 7056-7065.

* cited by examiner

31

30
32
14
12
18
19
16

$CO_2$ SEPARATION SYSTEMS AND METHODS

CROSS REFERENCE TO RELATED APPLICATION

This application is a continuation-in-part of PCT Patent Application No. PCT/US2021/057111 which was filed Oct. 28, 2021, entitled "$CO_2$ Separation Systems and Methods", which claims priority to and the benefit of U.S. Provisional patent application Ser. No. 63/106,729 filed Oct. 28, 2020, entitled "Building Emission Processing and/or Sequestration Systems and Methods"; U.S. Provisional patent application Ser. No. 63/106,759 filed Oct. 28, 2020, entitled "Building Emission Processing and/or Sequestration Systems and Methods"; and U.S. Provisional patent application Ser. No. 63/106,862 filed Oct. 28, 2020, entitled "Building Emission Processing and/or Sequestration Systems and Methods", the entirety of each of which is incorporated by reference herein.

This application is also a continuation-in-part of PCT Patent Application No. PCT/US2022/022853 which was filed Mar. 31, 2022, entitled "$CO_2$ Separation Systems and Methods", which claims priority to and the benefit of U.S. Provisional patent application Ser. No. 63/168,794 filed Mar. 31, 2021, entitled "Carbon Dioxide Separation Assemblies and Methods", and U.S. Provisional patent application Ser. No. 63/168,825 filed Mar. 31, 2021, entitled "combustion Assemblies and Methods and Carbon Dioxide Separation Assemblies and Methods", the entirety of each of which is incorporated by reference herein.

TECHNICAL FIELD

The field of the invention relates to $CO_2$ separation systems and methods. In particular embodiments, the systems and/or methods can separate $CO_2$ and provide heat and/or power. In particular implementations, the heat and power can be provided to buildings. Also, combustion products can be processed to separate $CO_2$ from the combustion products. Additionally, $CO_2$ can be separated from air. Further, power can be generated in the form of electricity while separating $CO_2$ from combustions products and/or air.

BACKGROUND

Carbon dioxide generation in buildings, particularly in large metropolitan areas, is a significant contributor to carbon dioxide generation overall. Carbon dioxide is currently listed as a global warming compound whose reduction is sought worldwide. The generation of carbon dioxide is a necessary part of respiration, which is a necessary part of life, but it is important to limit the generation of carbon dioxide in an effort to address climate change. The present disclosure provides power systems as well as power systems and methods for building emission processing and sequestration systems that can address carbon dioxide generation from combustion of fossil fuels and proliferation thereof in metropolitan areas. Additionally, the $CO_2$ separation systems and methods of the present disclosure can separate $CO_2$ from combustion products and/or air, and, in some embodiments, generated power in the form of electricity.

SUMMARY

Systems for separating $CO_2$ from a combustion product are provided. The systems can include: a combustion product stream; the combustion stream comprising at least $CO_2$ and $N_2$; and a carbonate electrochemical cell operatively aligned with the combustion stream and configured to react the $CO_2$ from the combustion product stream and $O_2$ to form carbonate ion and react the carbonate ion to form a $CO_2$ product stream.

Methods for separating $CO_2$ from a combustion product stream are also provided. The methods can include: receiving a combustion product stream comprising $CO_2$ and $N_2$; reacting the combustion product stream to form carbonate ion; and reacting the carbonate ion to form a $CO_2$ product stream.

Systems for separating $CO_2$ from air are also provided. The systems can include: an air stream with the air stream comprising at least $CO_2$ and $N_2$; and a carbonate fuel cell operatively aligned with the air stream and configured to react the $CO_2$ from the air stream and $O_2$ to form carbonate ion and react the carbonate ion to form a $CO_2$ product stream.

Systems or methods for operating a combustion boiler within a building are provided. The systems or methods can include: providing air and fuel to a combustion burner; combusting the air and fuel within the combustion burner; monitoring the amount of free oxygen in the burner; and controlling the amount of air and fuel provided to the burner to maintain a free oxygen amount of about 3%. The systems or methods can include: combusting air and fuel within a burner to produce flue gas having an oxygen concentration; and restricting air from the flue gas by substantially eliminating tramp air within the conduit operably aligned to convey flue gas from the burner.

Systems or methods for cooling flue gas from a combustion boiler within a building are provided. The systems or methods can include providing the flue gas to at least one economizer having at least one set of cooling coils conveying the boiler feed water, the providing cooling the flue gas and heating the boiler feed water.

Systems or methods for separating carbon dioxide from flue gas generated from a combustion boiler within a building are provided. The systems or methods can include: providing flue gas comprising less than about 3% water; compressing the flue gas; and cooling the compressor with a heat transfer fluid and providing the heat transfer fluid to/from a chiller and/or a cooling tower. The systems or methods can include: compressing the flue gas; and drying the flue gas using nitrogen recovered during separation of carbon dioxide recovered from the flue gas. The systems or methods can include: removing at least some of the nitrogen from the flue gas to produce greater than about 95% carbon dioxide using a pressure swing adsorption assembly; and using the nitrogen removed from the flue gas to remove water from the flue gas before providing the flue gas to the pressure swing adsorption assembly. The systems or methods can include: removing at least some of the nitrogen from the flue gas to produce greater than about 95% carbon dioxide using a pressure swing adsorption assembly; and providing at least some of the nitrogen removed from the flue gas to a gas expander/generator. The systems or methods can include: removing at least some of the nitrogen from the flue gas to produce greater than 95% carbon dioxide using a pressure swing adsorption assembly; and providing the at least some of the nitrogen removed from the flue gas to both a dryer and an expander/generator, or to a dryer and control valve. The control valve may or may not be equipped with a silencer.

System or methods for cooling carbon dioxide separated from flue gas generated from a combustion boiler within a building are provided. The system or methods can include:

separating nitrogen from flue gas using a pressure swing adsorption assembly; expanding the nitrogen through a turbine expander within the presence of a heat exchanger to cool fluid within the heat exchanger; and transferring that cooled fluid to another heat exchanger operably aligned with the carbon dioxide product of the pressure swing adsorption assembly to cool the carbon dioxide product.

System or methods for liquefying carbon dioxide separated from flue gas generated from a combustion boiler within a building are provided. The system or methods can include providing the gaseous carbon dioxide through a sparge assembly into liquid carbon dioxide within a storage vessel.

Buildings utilizing a carbon fuel source and generating carbon emission upon combustion of the carbon fuel source are provided. Building emissions can be operably coupled to a carbon capture system, the system configured to separate and condense carbon dioxide from the carbon emission. The system can be configured to process the carbon emission and return heat to the building. The system can be configured to process the carbon emission and generate electricity. The system can be configured to process the carbon emission and store electrical energy. The system can be configured to dynamically control the combustion and capture systems to reduce carbon combustion and increase carbon capture.

Combustion systems are provided that can include a combustion assembly operatively engaged with an air intake, wherein the air intake performs air enrichment.

Methods for enriching air to a combustion assembly are also provided. The methods can include: forming an $N_2$-rich stream and an $O_2$-rich stream from a first air stream; supplementing a second air stream with the $O_2$-rich stream to enrich the second air stream with $O_2$; and combusting the enriched air stream.

Systems from separating $CO_2$ from flue gas are also provided. The systems can include a vortex tube assembly operably coupled to a component of the system that provide pressurized $N_2$.

Methods for heating or cooling components of a system for separating $CO_2$ from flue gas are also provided. The methods can include: providing compressed nitrogen from one or more components of the system to a vortex tube to form a heated nitrogen stream and cooled nitrogen stream; providing the heated nitrogen stream to components benefiting from a heat source; and providing the cooled nitrogen stream to components benefiting from a cooling source.

Systems for separating $CO_2$ from flue gas can also include a separation assembly that includes a membrane assembly configured to separate $CO_2$ from $N_2$.

Methods for separating $CO_2$ from flue gas can also include providing a flue gas stream comprising $CO_2$ and $N_2$ to a first membrane separation system to form a $CO_2$-rich stream and an $N_2$-rich stream.

DRAWINGS

Embodiments of the disclosure are described below with reference to the following accompanying drawings.

Figures 5, 6:
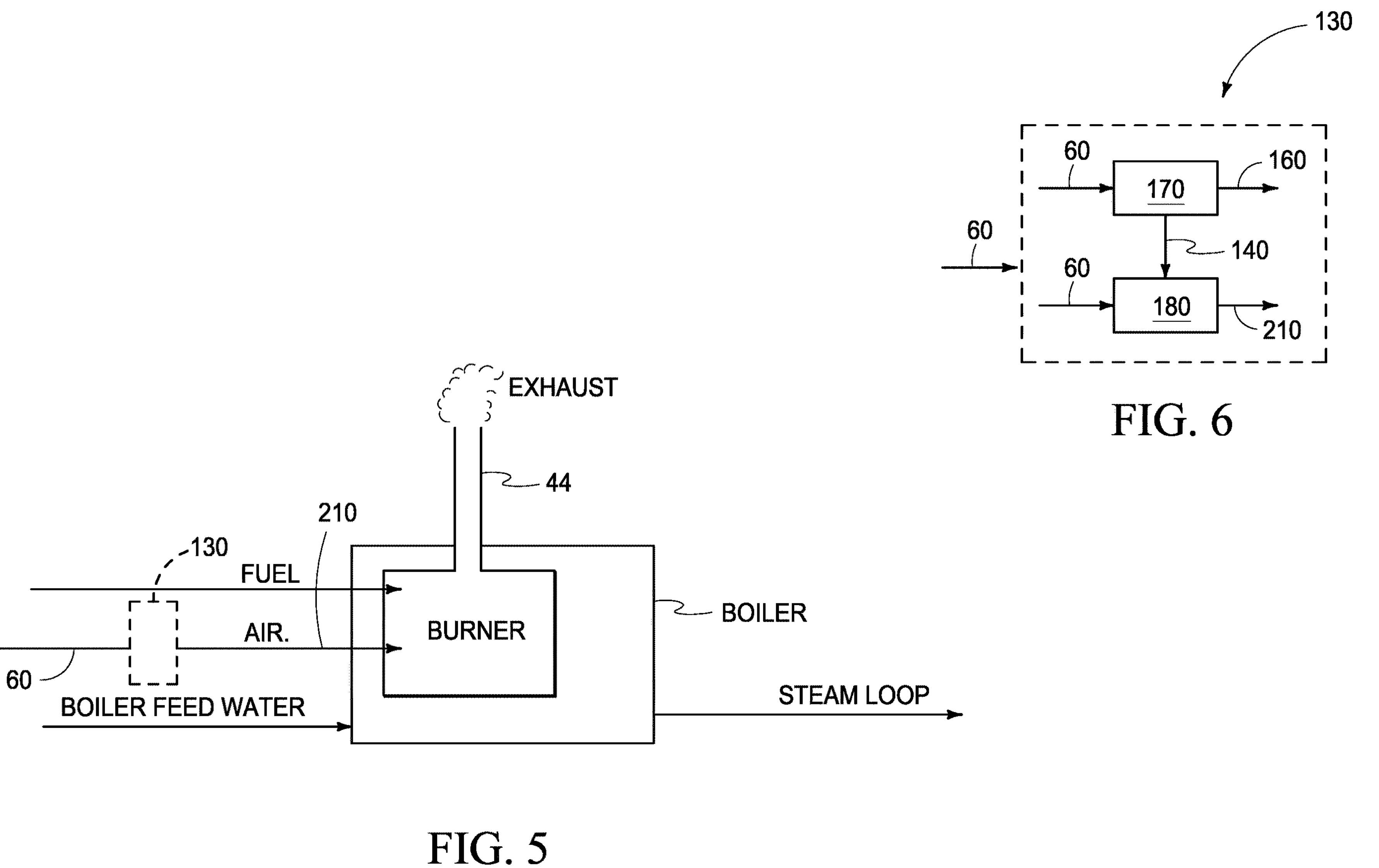

FIG. 5. is depiction of a combustion assembly according to an embodiment of the disclosure.

FIG. 6. is a depiction of an air enrichment assembly according to an embodiment of the disclosure.

Figure 7:
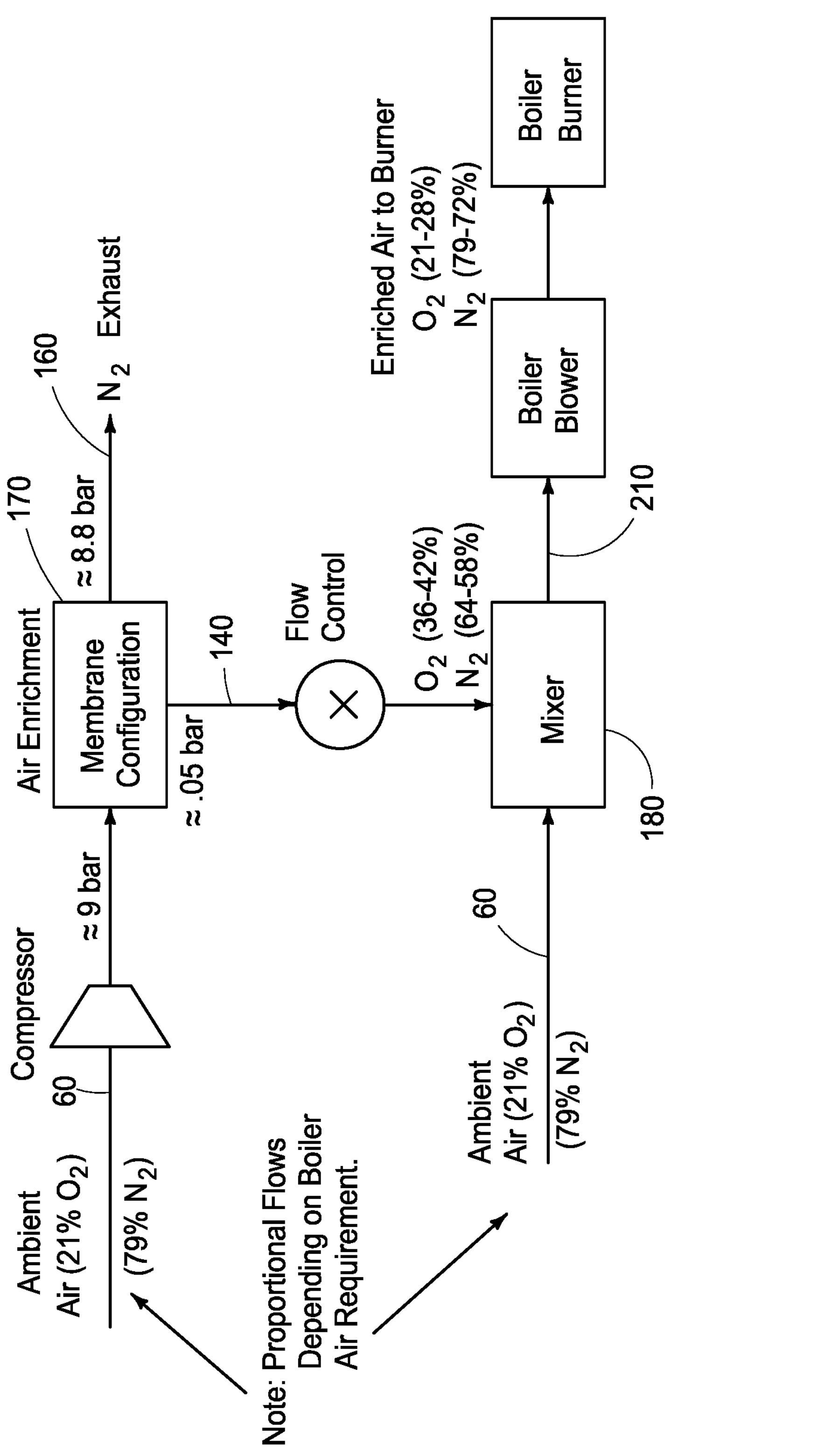

FIG. 7 is a depiction of combustion in-take flow/assembly according to an embodiment of the disclosure.

Figure 8A:
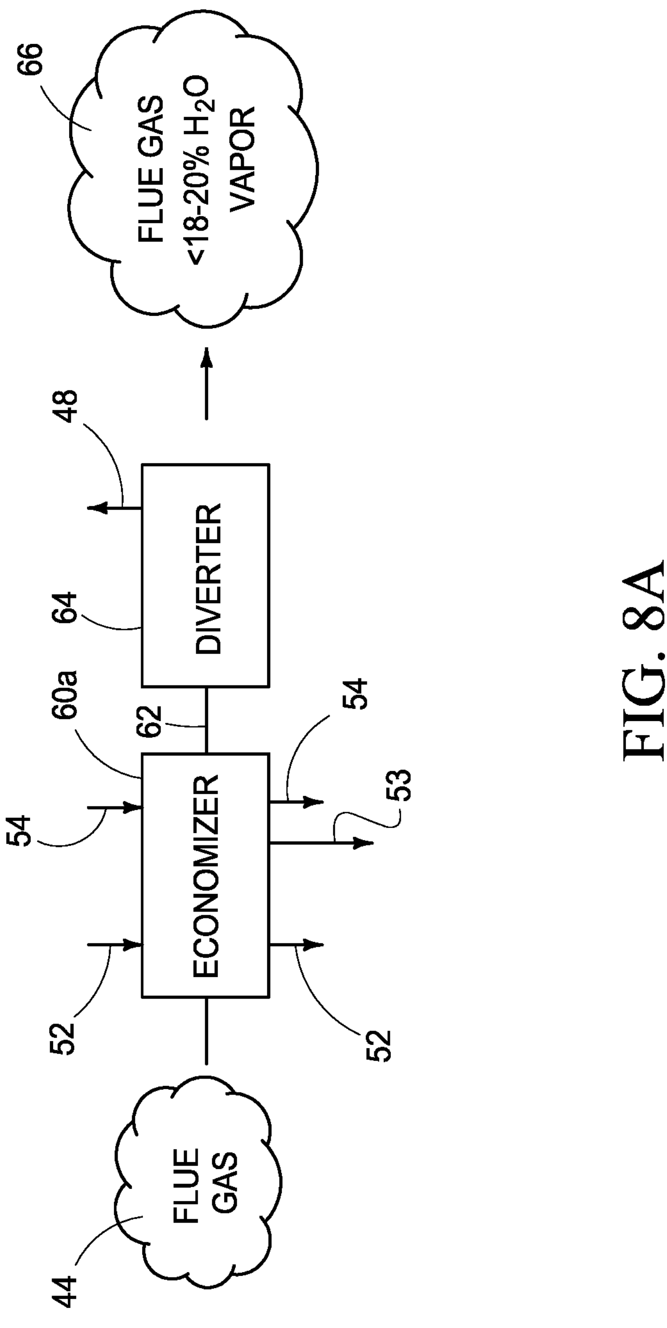

FIG. 8A is a portion of a carbon dioxide capture method and/or system according to an embodiment of the disclosure.

Figures 8B, 8C:
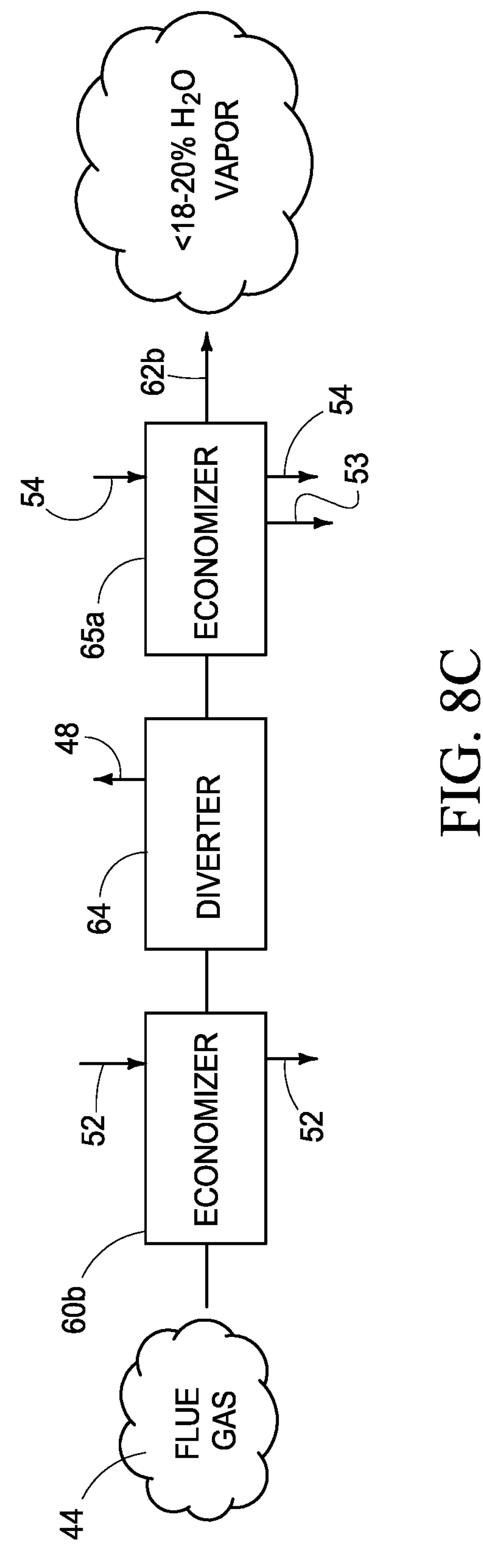

FIG. 8B is a portion of a carbon dioxide capture method and/or system according to another embodiment of the disclosure.

FIG. 8C is a portion of a carbon dioxide capture method and/or system according to another embodiment of the disclosure.

Figures 9A, 9B:
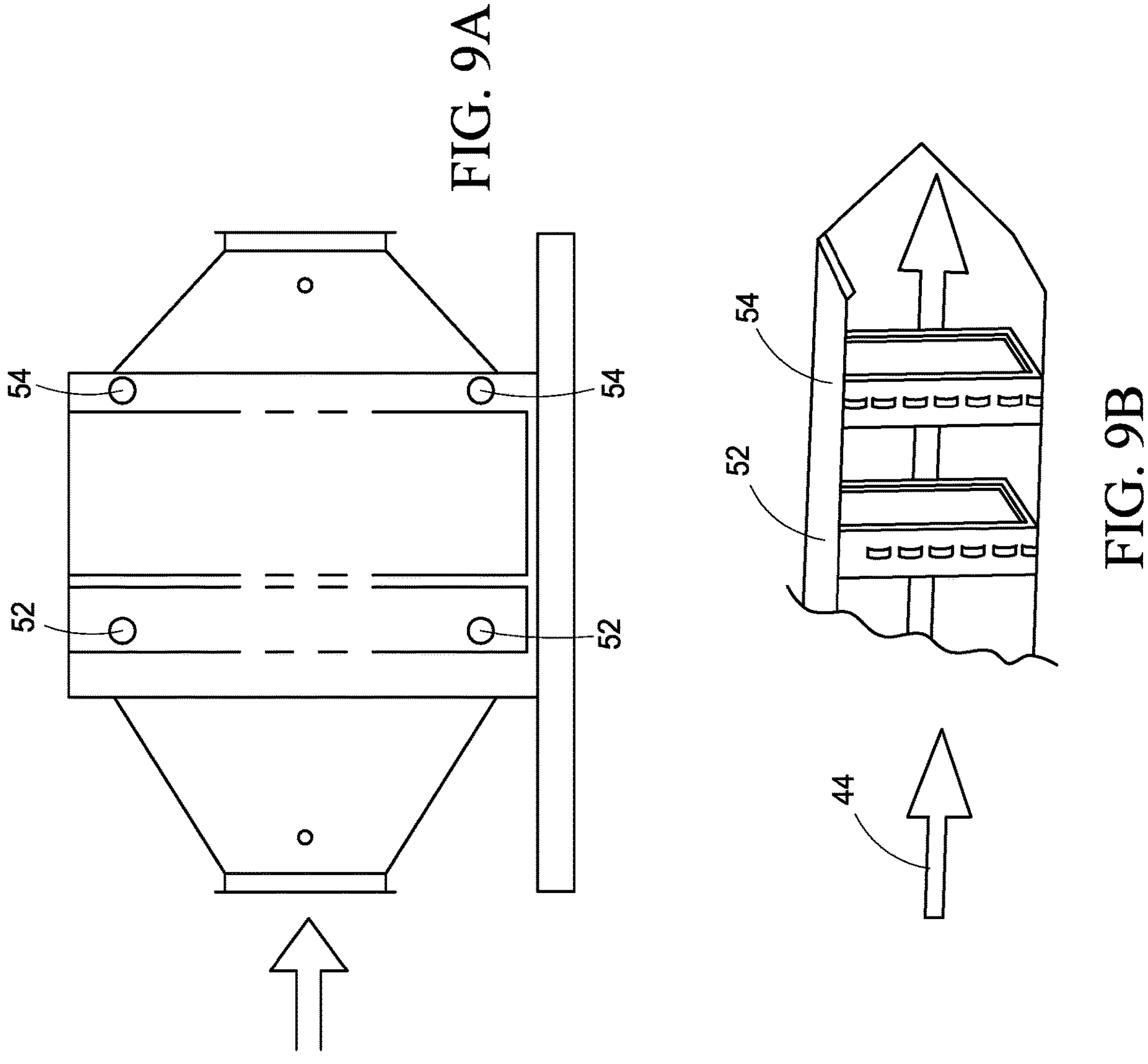

FIG. 9A is an example configuration of a component of a carbon dioxide capture method and/or system according to an embodiment of the disclosure.

FIG. 9B is another example configuration of a component of a carbon dioxide capture method and/or system according to an embodiment of the disclosure.

Figure 10:
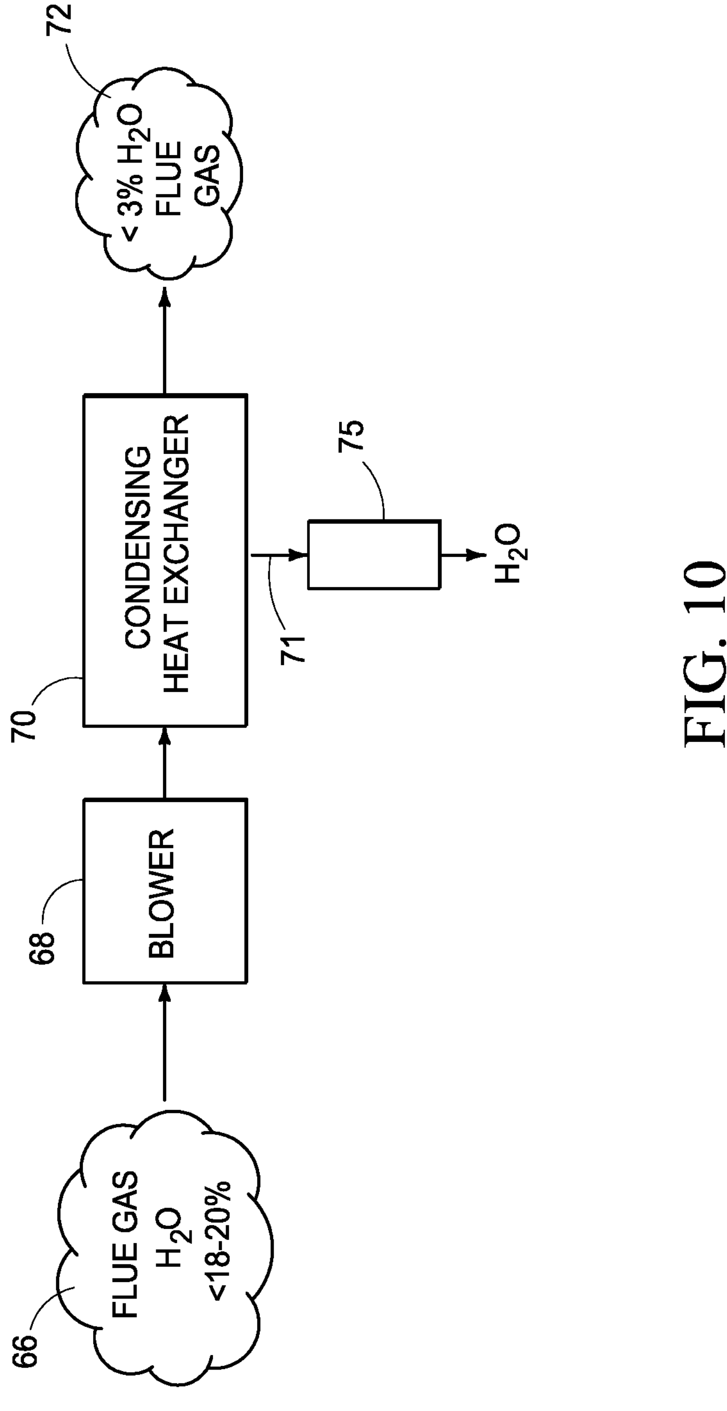

FIG. 10 is a portion of a carbon dioxide capture method and/or system according to an embodiment of the disclosure.

Figure 11:
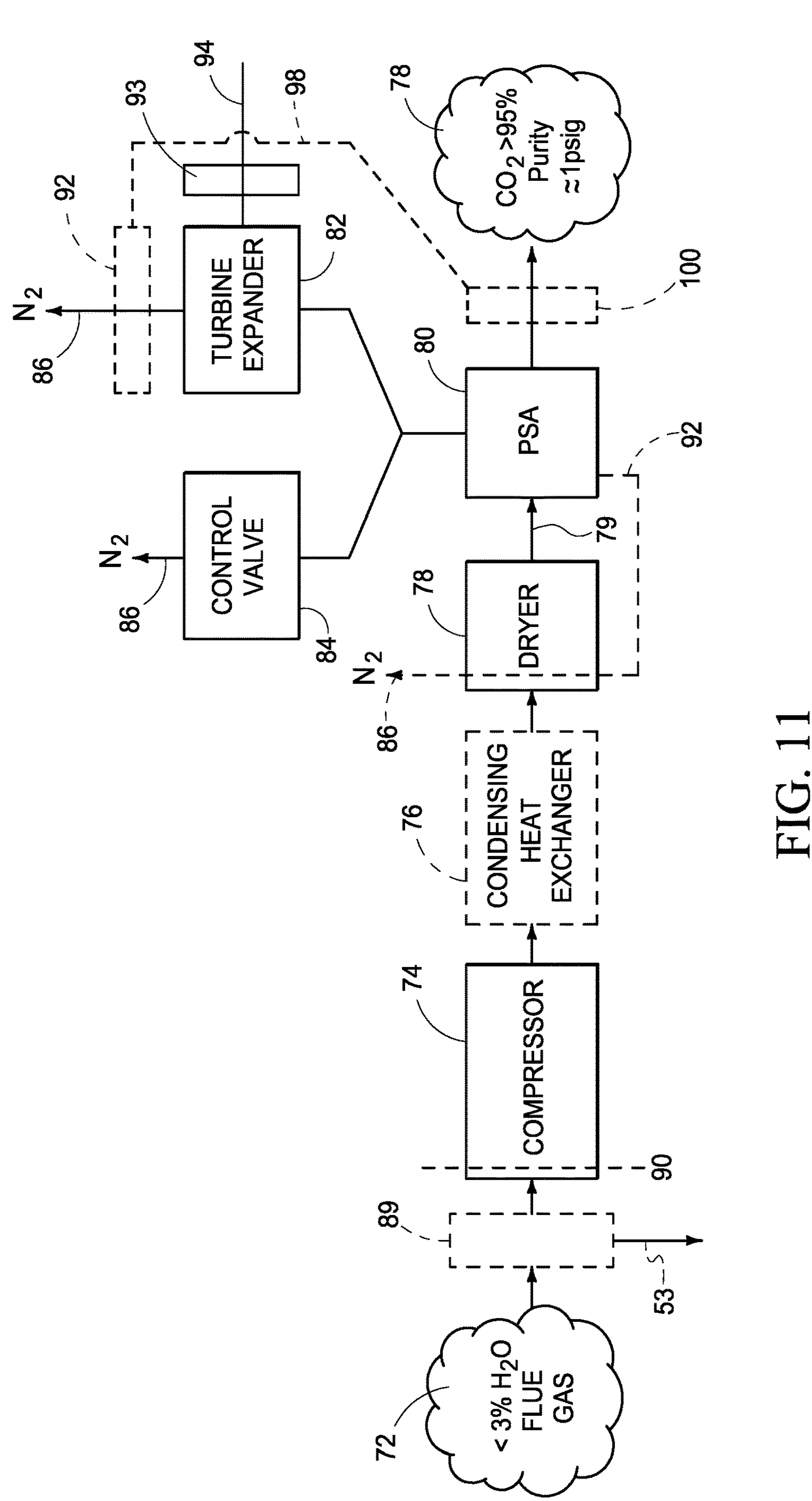

FIG. 11 is a portion of a carbon dioxide capture method and/or system according to an embodiment of the disclosure.

Figure 12B:
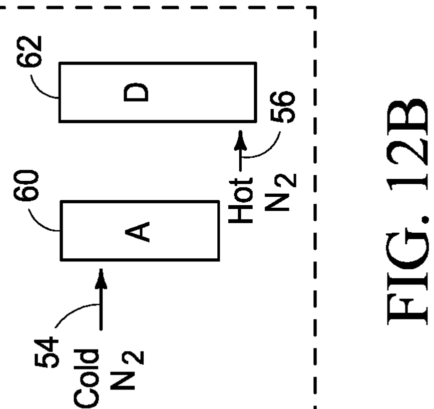
Figure 12A:
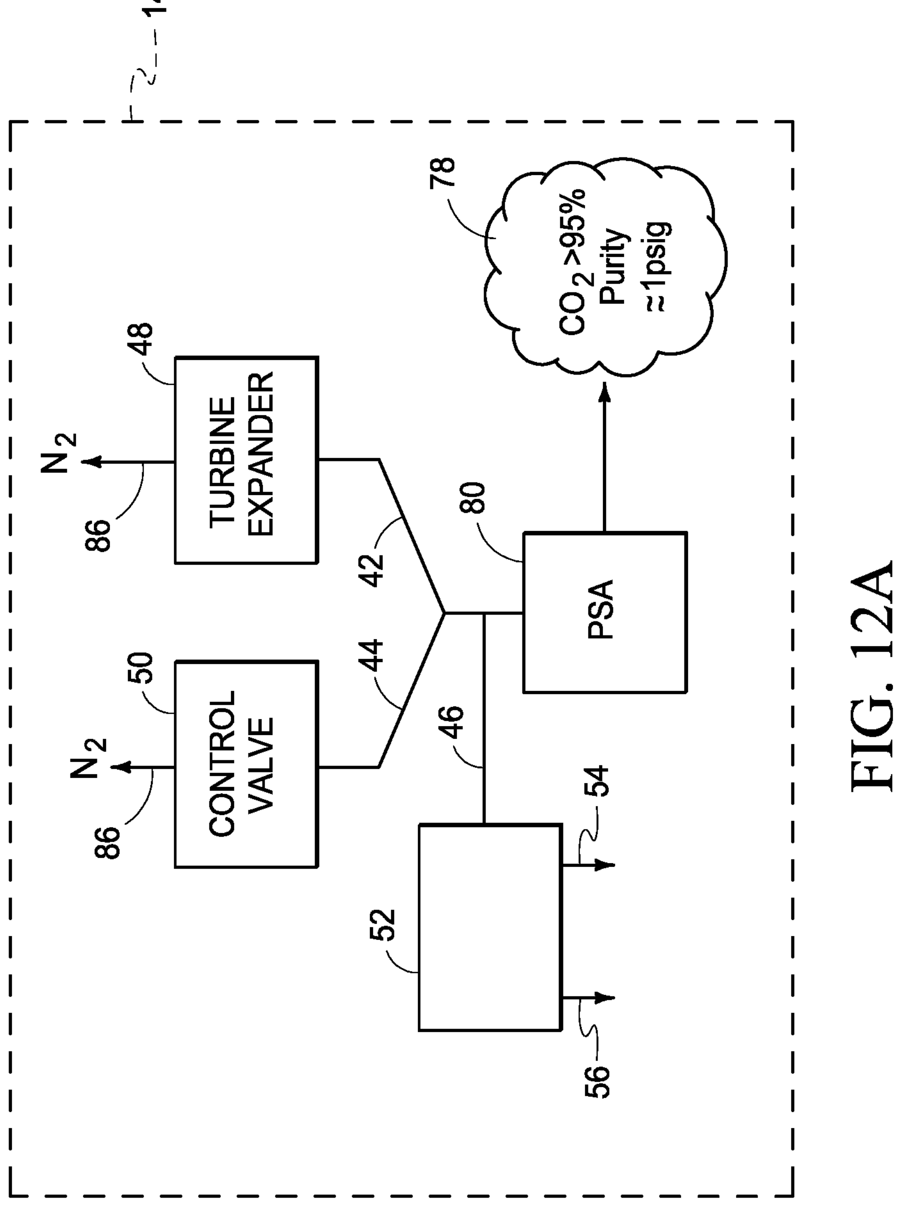

FIGS. 12A and 12B are depictions of a carbon dioxide separation assemblies according to embodiments of the disclosure.

Figure 13:
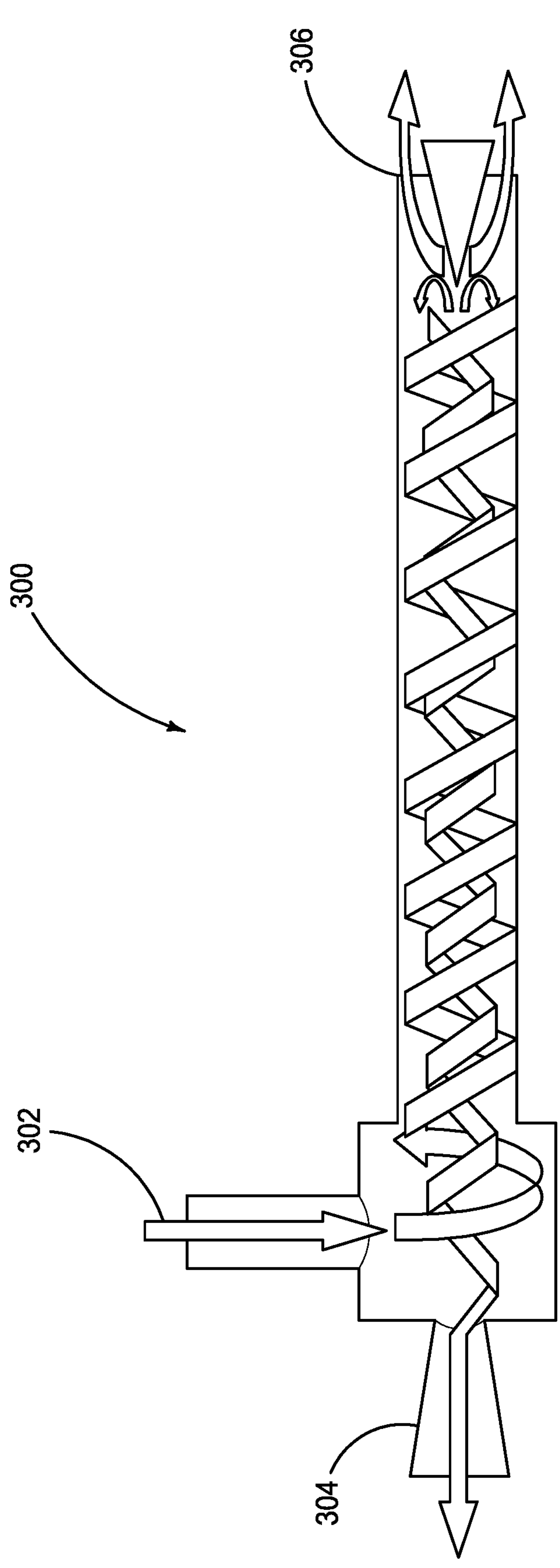
Figure 13:

FIG. 13 is a depiction of a vortex tube according to an embodiment of the disclosure.

Figure 14:
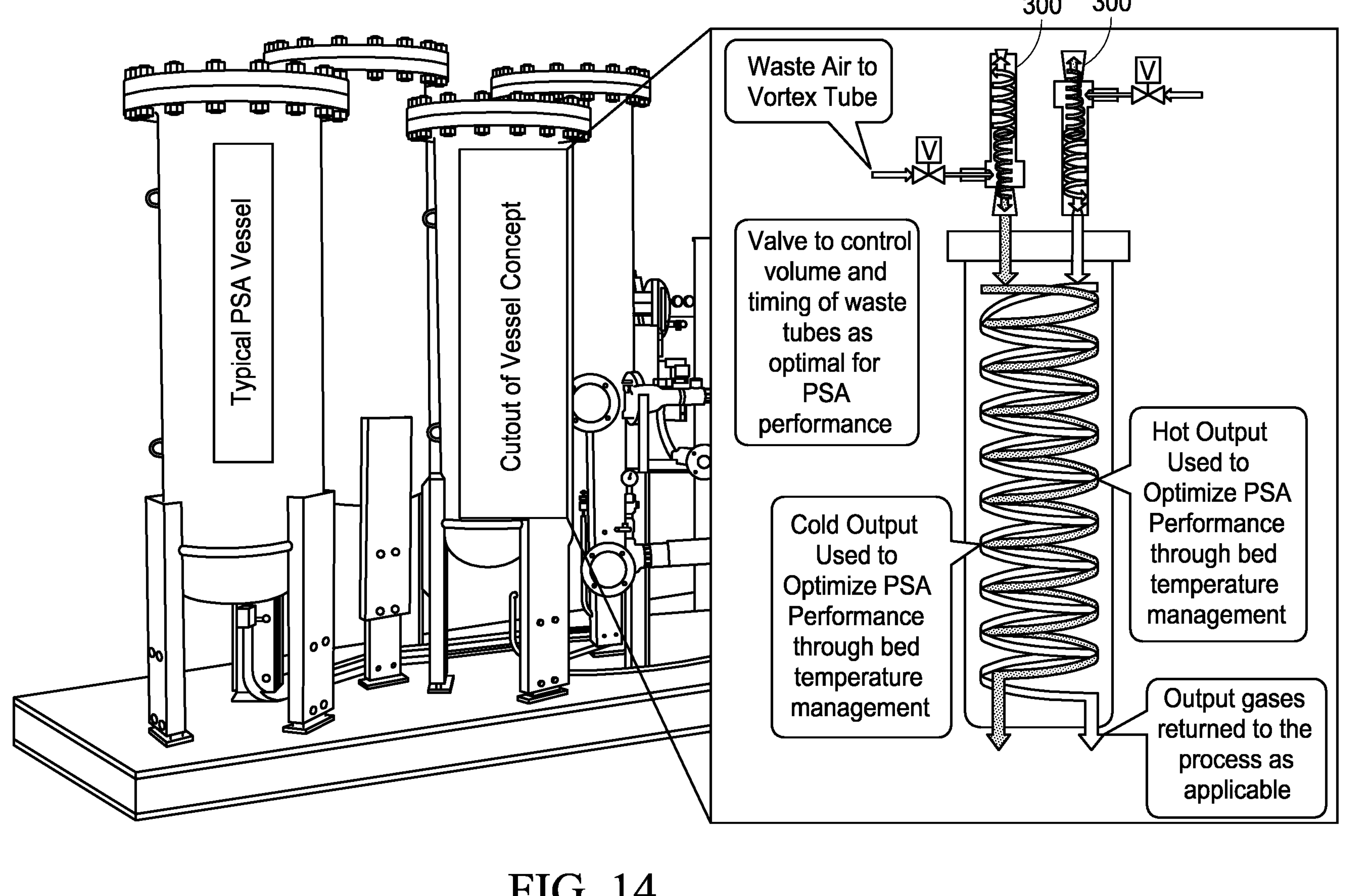

FIG. 14 is an example implementation of the vortex tube assembly of FIG. 13 in combination with a separation assembly (e.g., Pressure Swing Adsorption (PSA) assembly) according to an embodiment of the disclosure.

Figure 15:
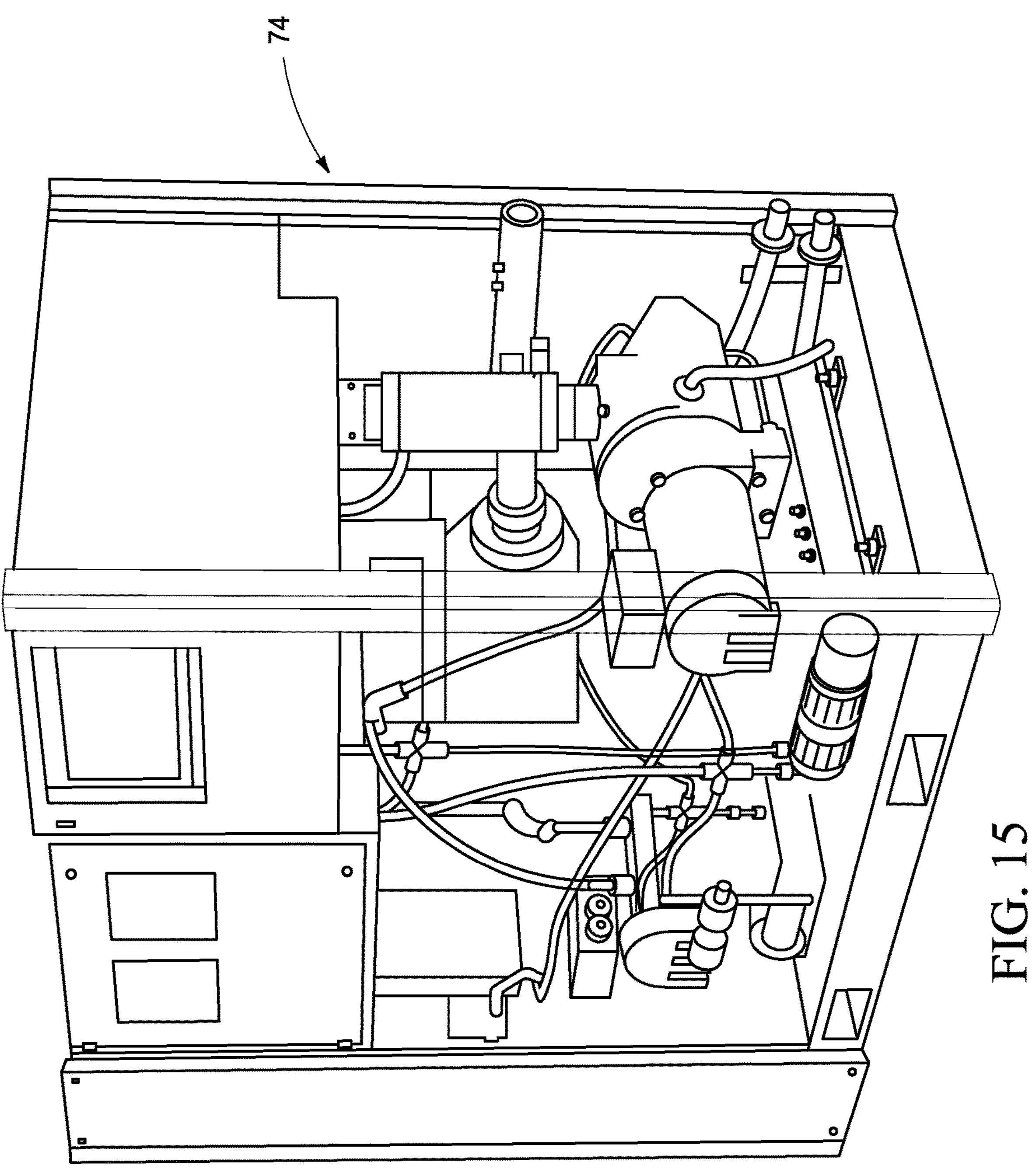

FIG. 15 is a is an example configuration of a component of a carbon dioxide capture method and/or system according to an embodiment of the disclosure.

Figure 16A:
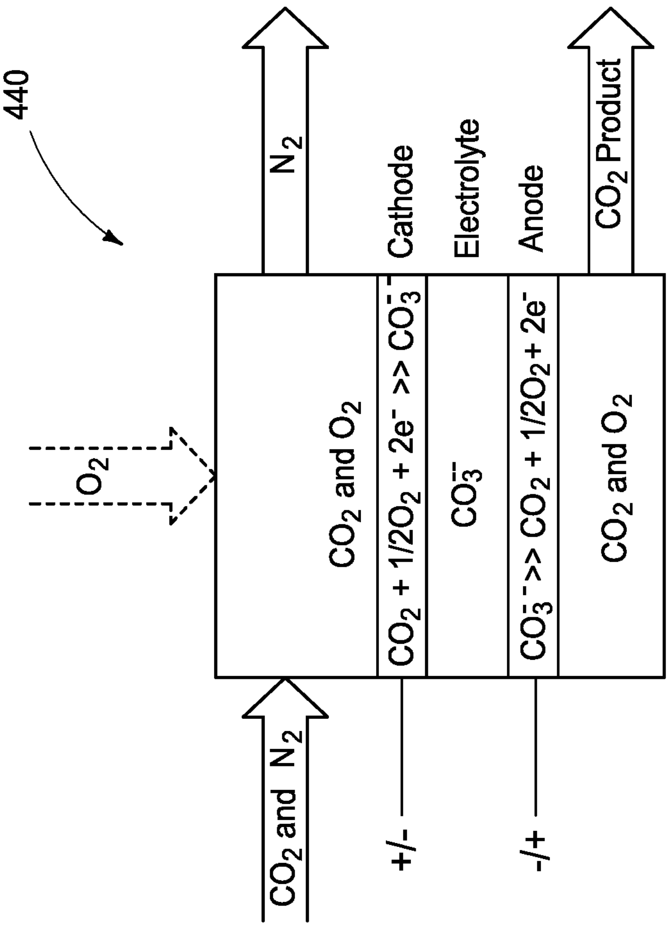

FIG. 16A is an example of a $CO_2$ separation system according to an embodiment of the disclosure.

Figure 16B:
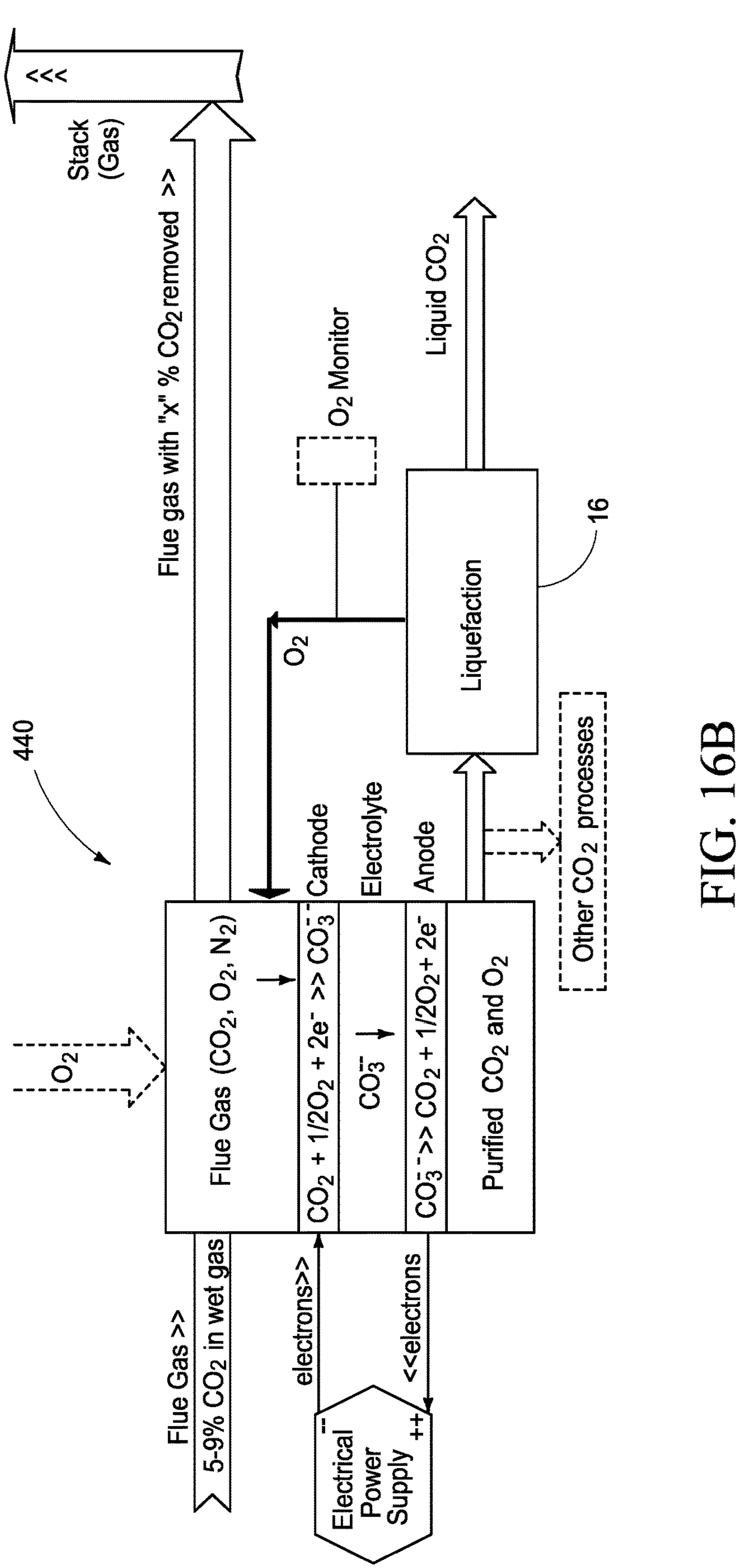

FIG. 16B is an example $CO_2$ separation system component according to an embodiment of the disclosure configured to operate as a carbonate pump.

Figure 16C:
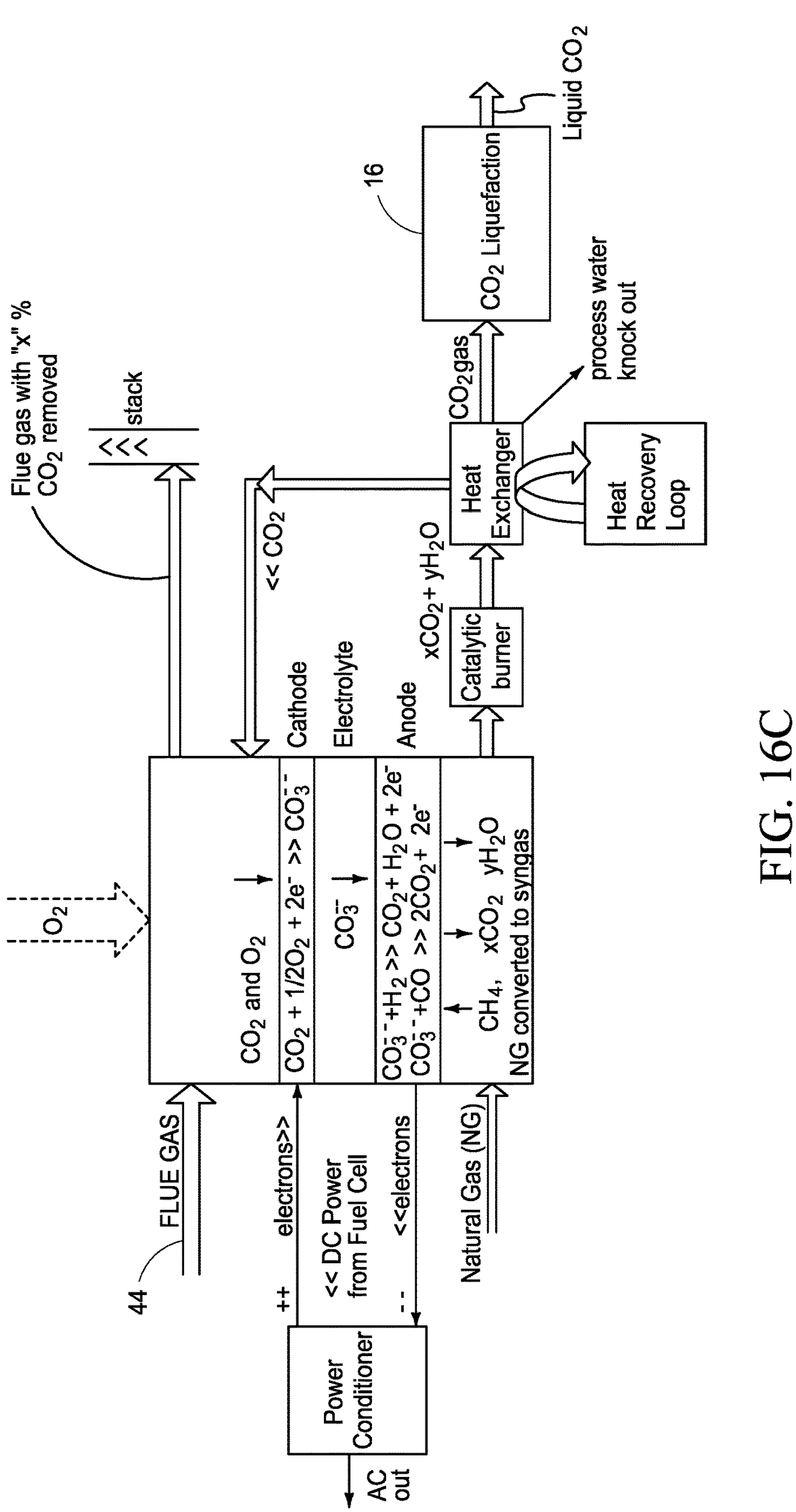

FIG. 16C is an example $CO_2$ separation system component according to an embodiment of the disclosure configured to receive $CO_2$ and $N_2$ from a flue gas source and operate as a carbonate fuel cell.

Figure 16D:
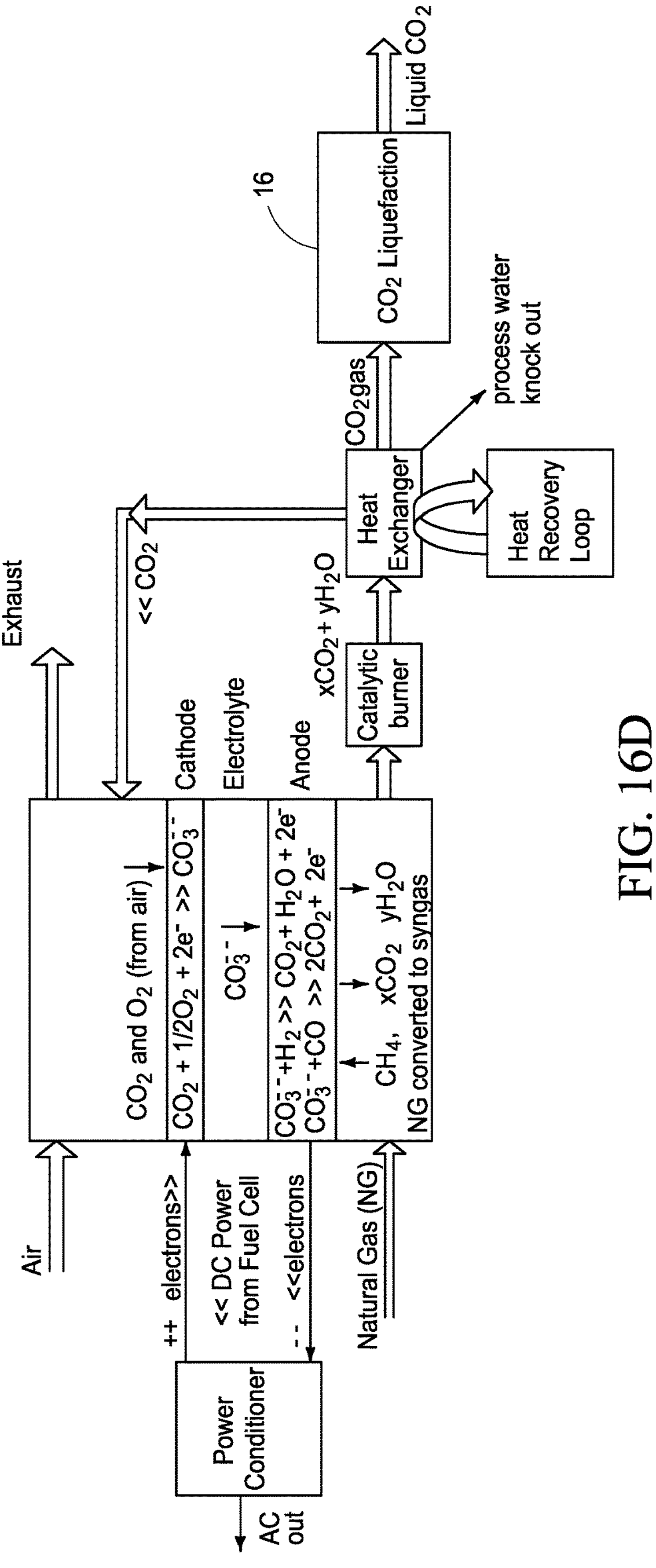

FIG. 16D is an example $CO_2$ separation system according to an embodiment of the disclosure configured to receive $CO_2$ and $N_2$ from an air source and operate as a carbonate fuel cell.

Figure 17:
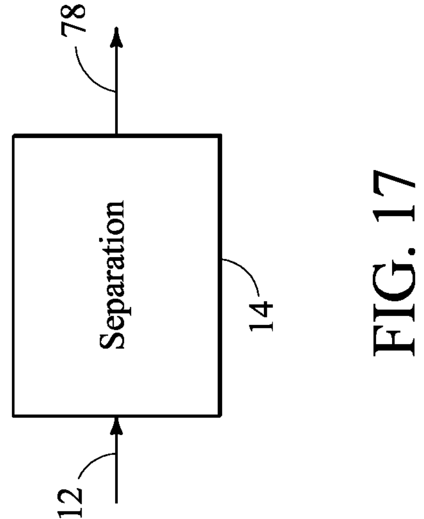

FIG. 17 is a general separation component according to an embodiment of the disclosure.

Figure 18:
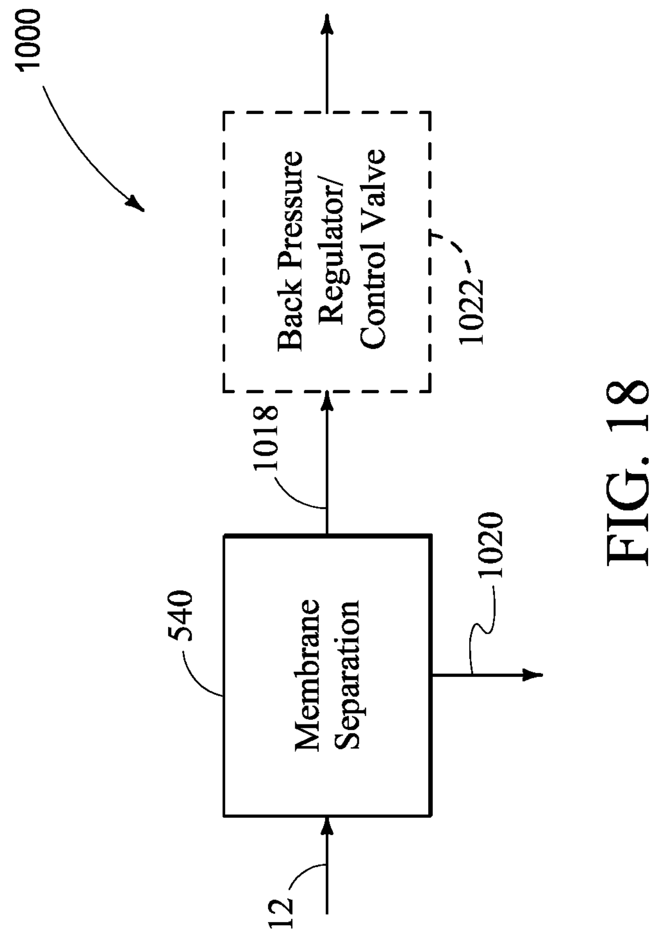

FIG. 18 is a membrane separation component according to an embodiment of the disclosure.

Figure 19:
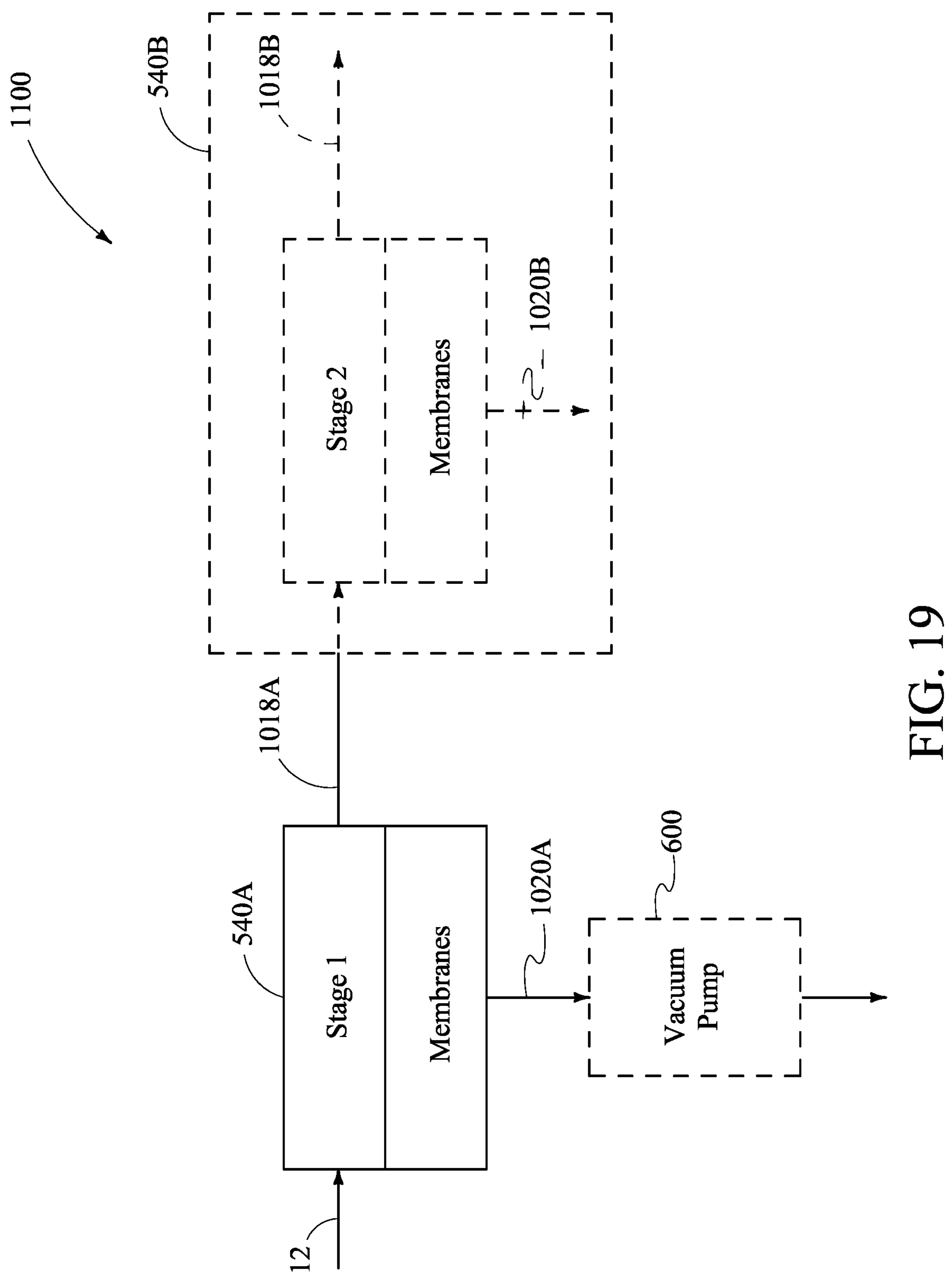
Figure 20:
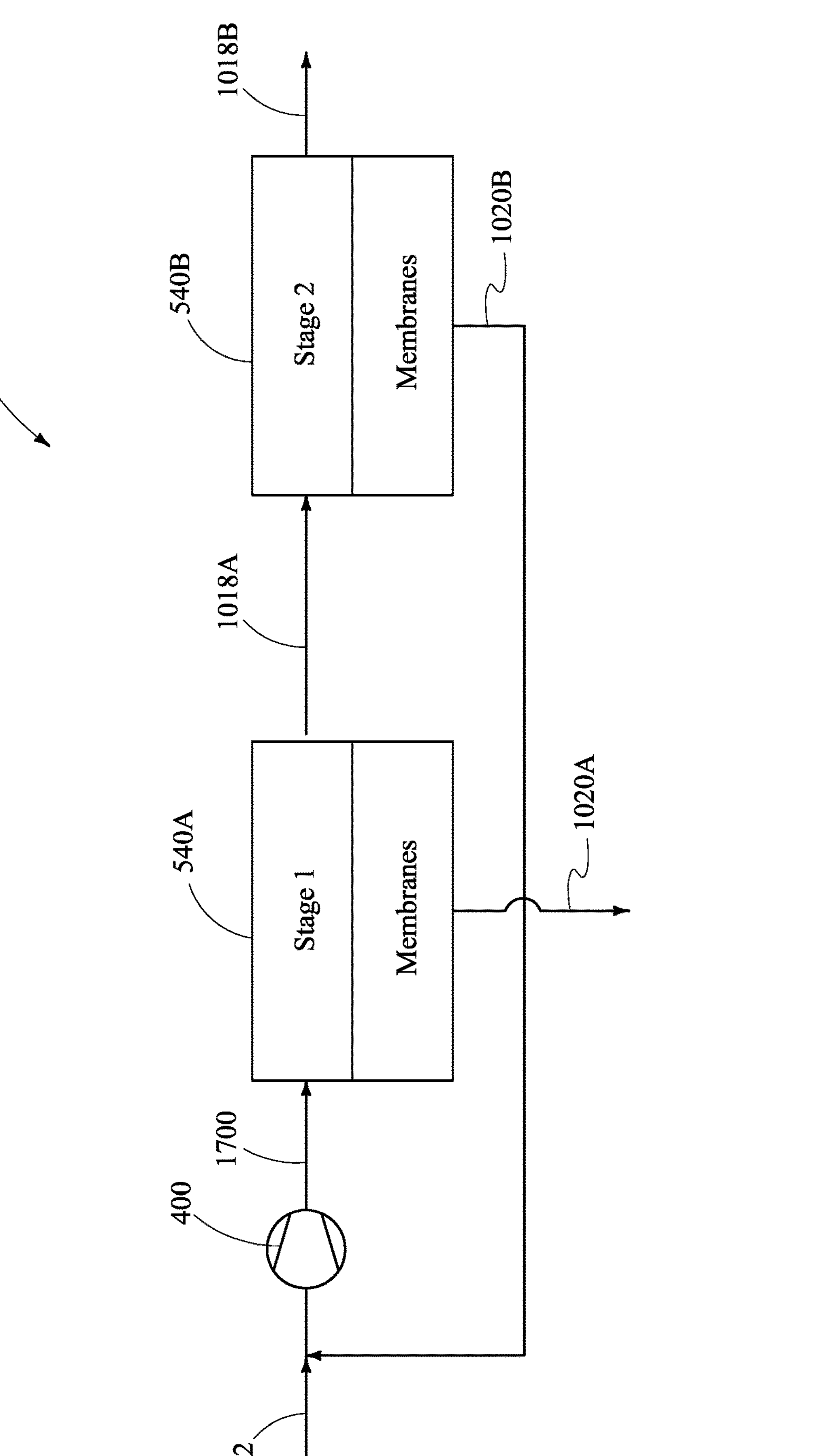
Figure 21:
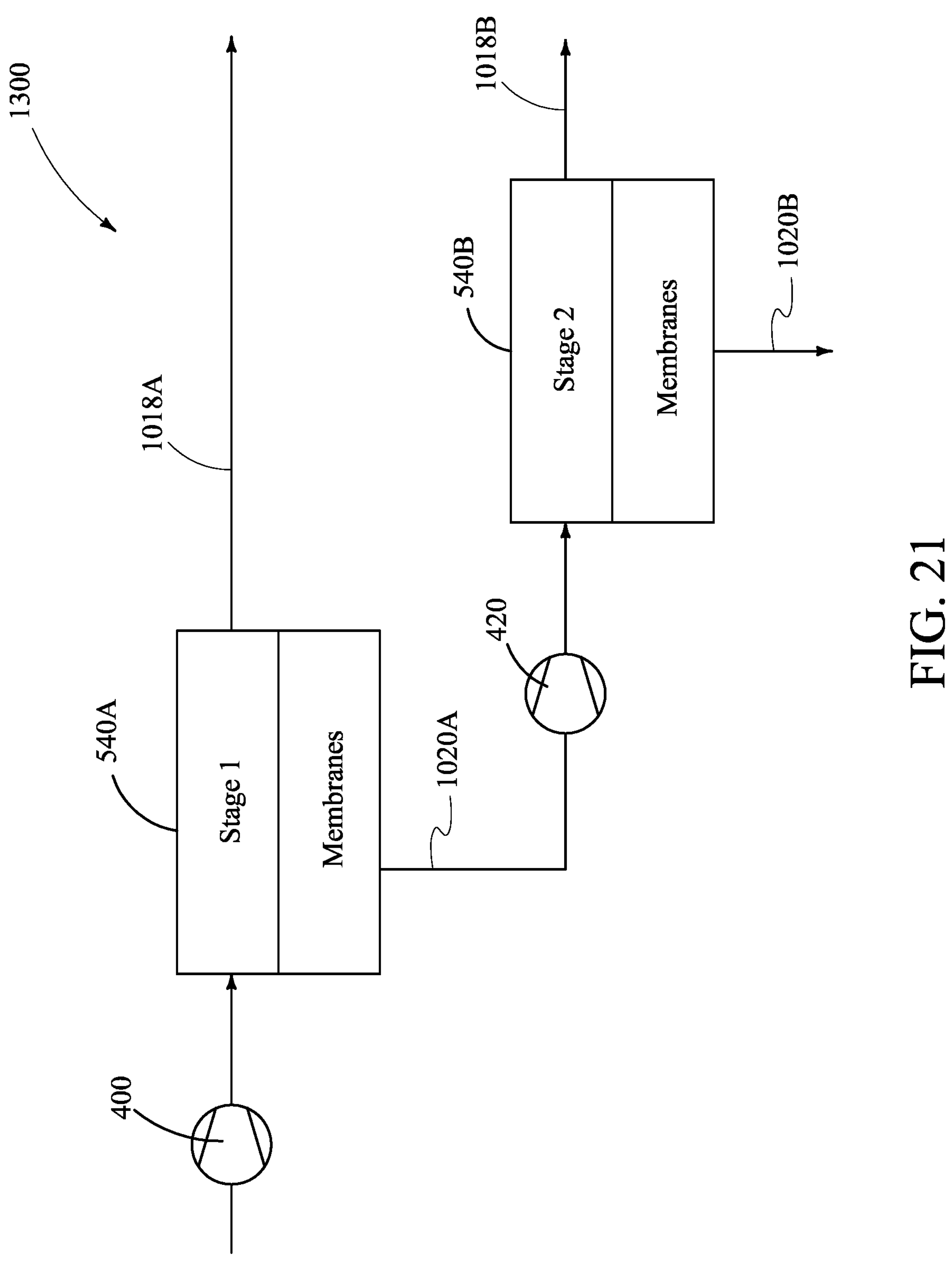

FIGS. 19-21 depict different configurations of membrane separation assemblies and methods according to embodiments of the disclosure.

Figure 22:
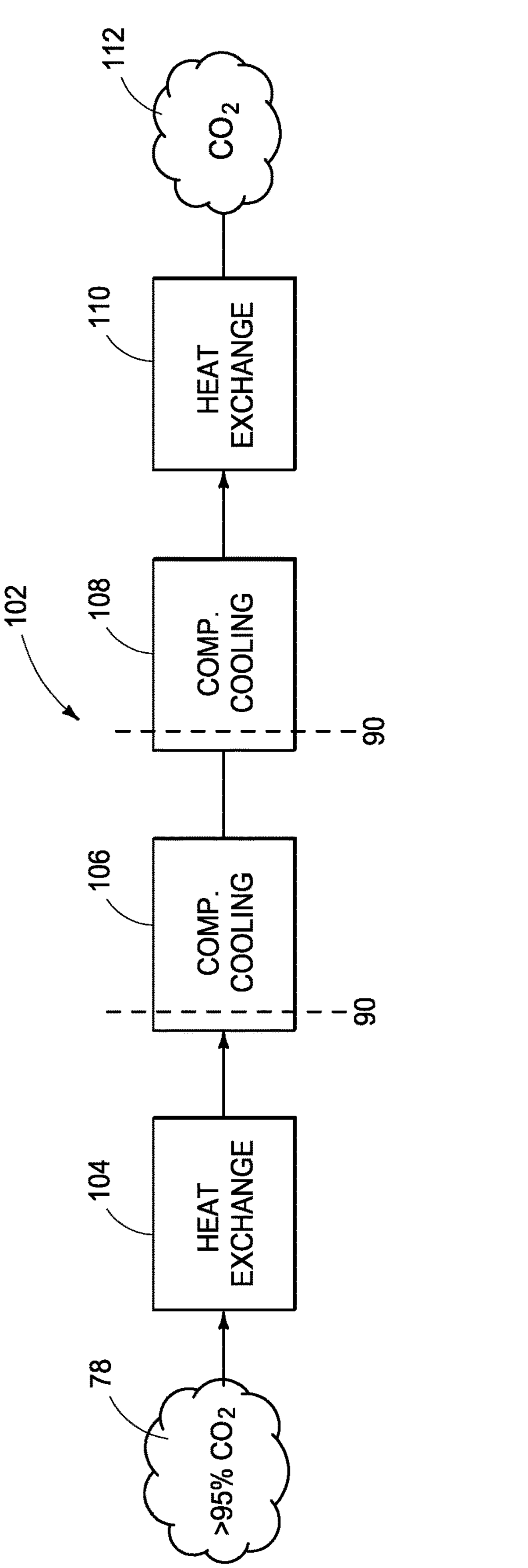

FIG. 22 is a portion of a carbon dioxide capture method and/or system according to an embodiment of the disclosure.

Figure 23:
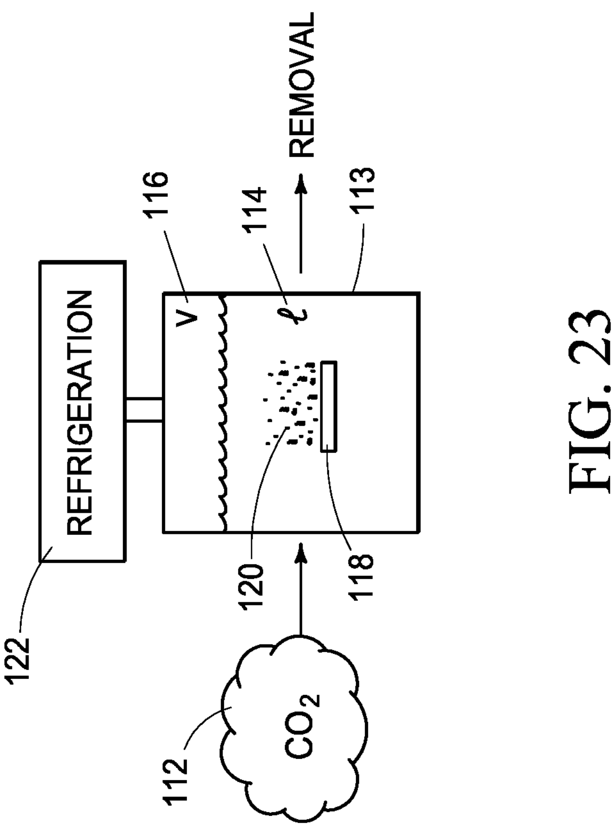

FIG. 23 is a portion of a carbon dioxide capture method and/or system according to another embodiment of the disclosure.

Figure 24:
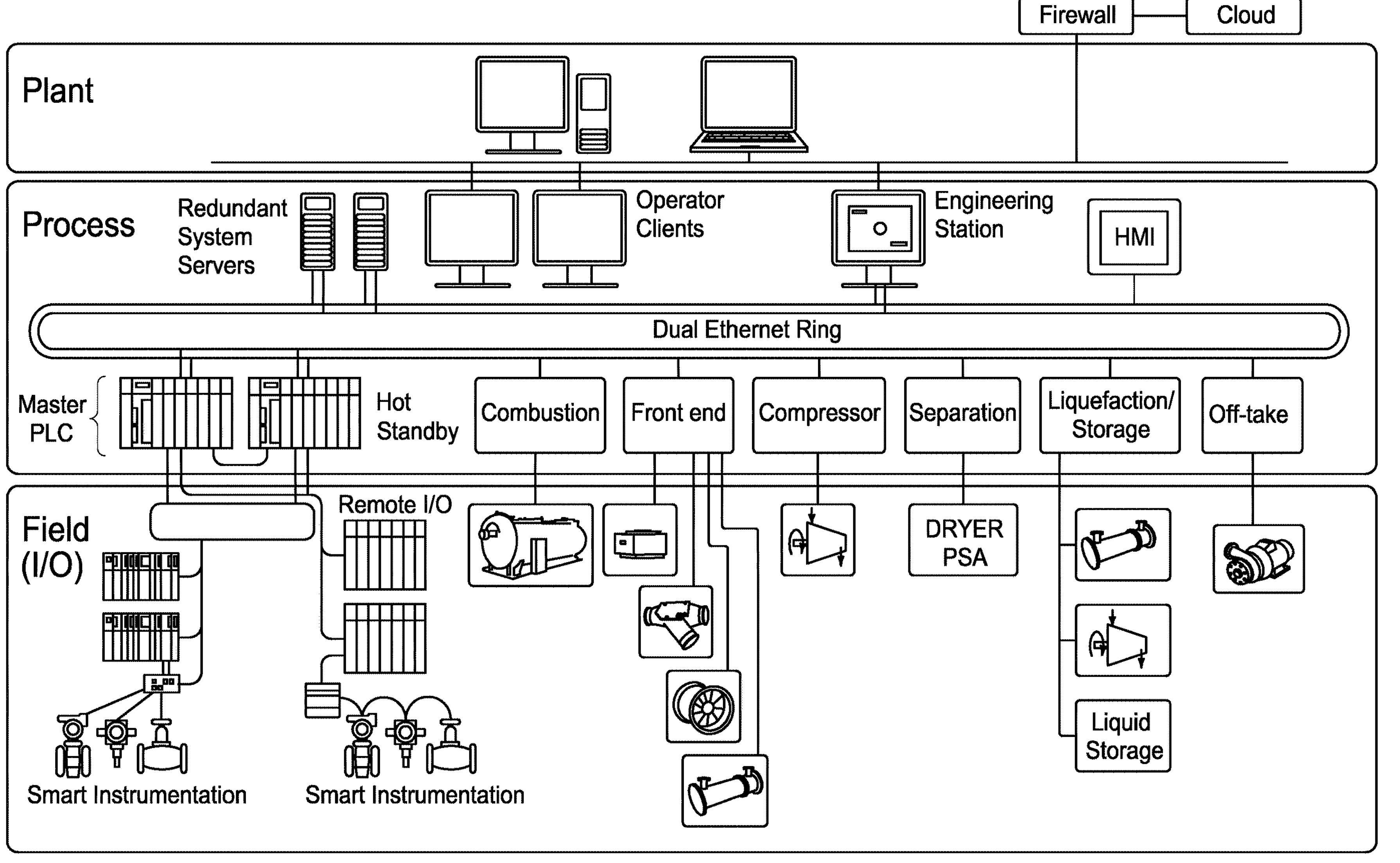

FIG. 24 is a portion of a carbon dioxide capture method and/or system according to an embodiment of the disclosure.

Figure 25A:
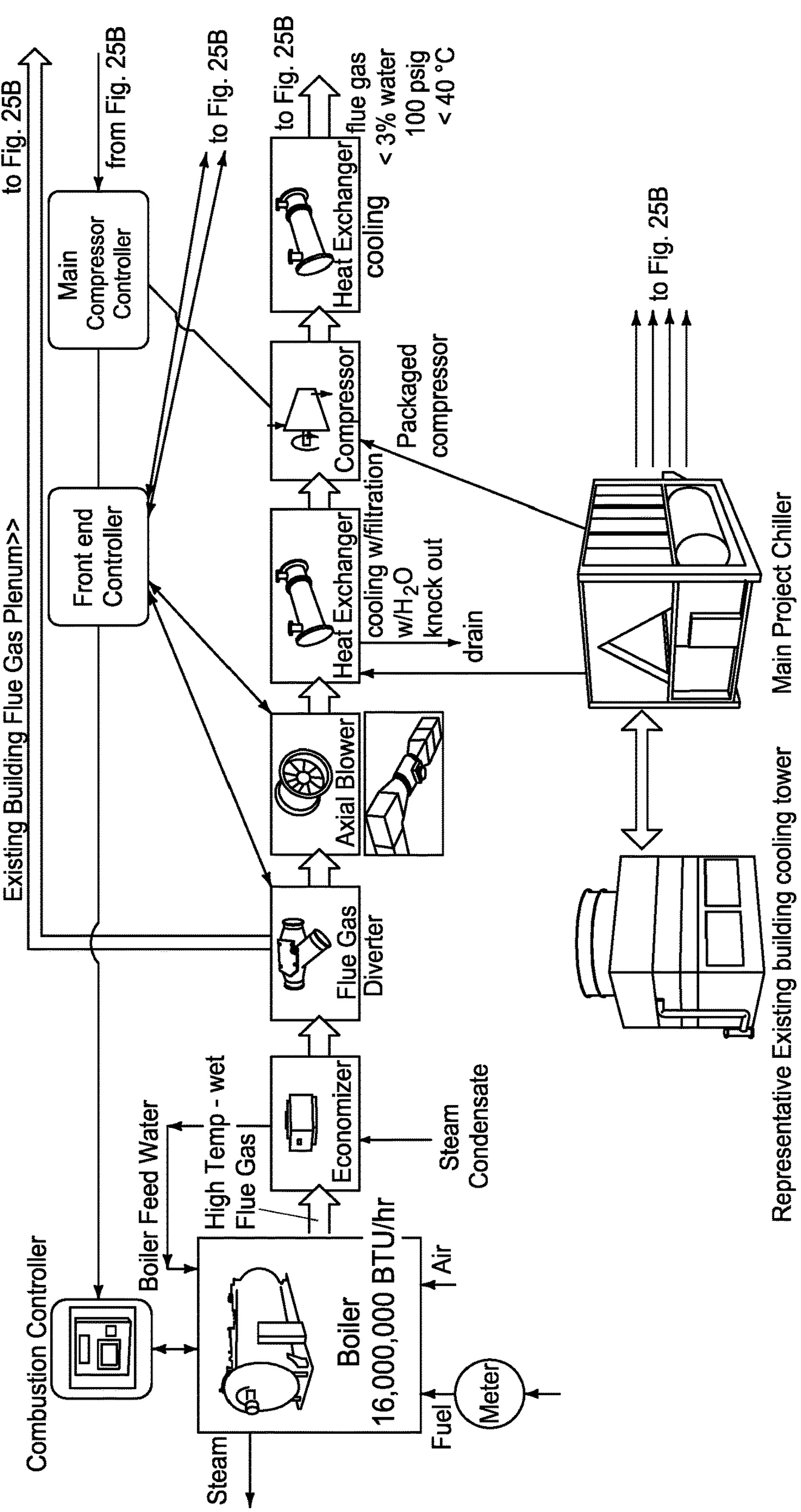

FIG. 25A is a portion of a carbon dioxide capture method and/or system according to an embodiment of the disclosure.

Figure 25B:
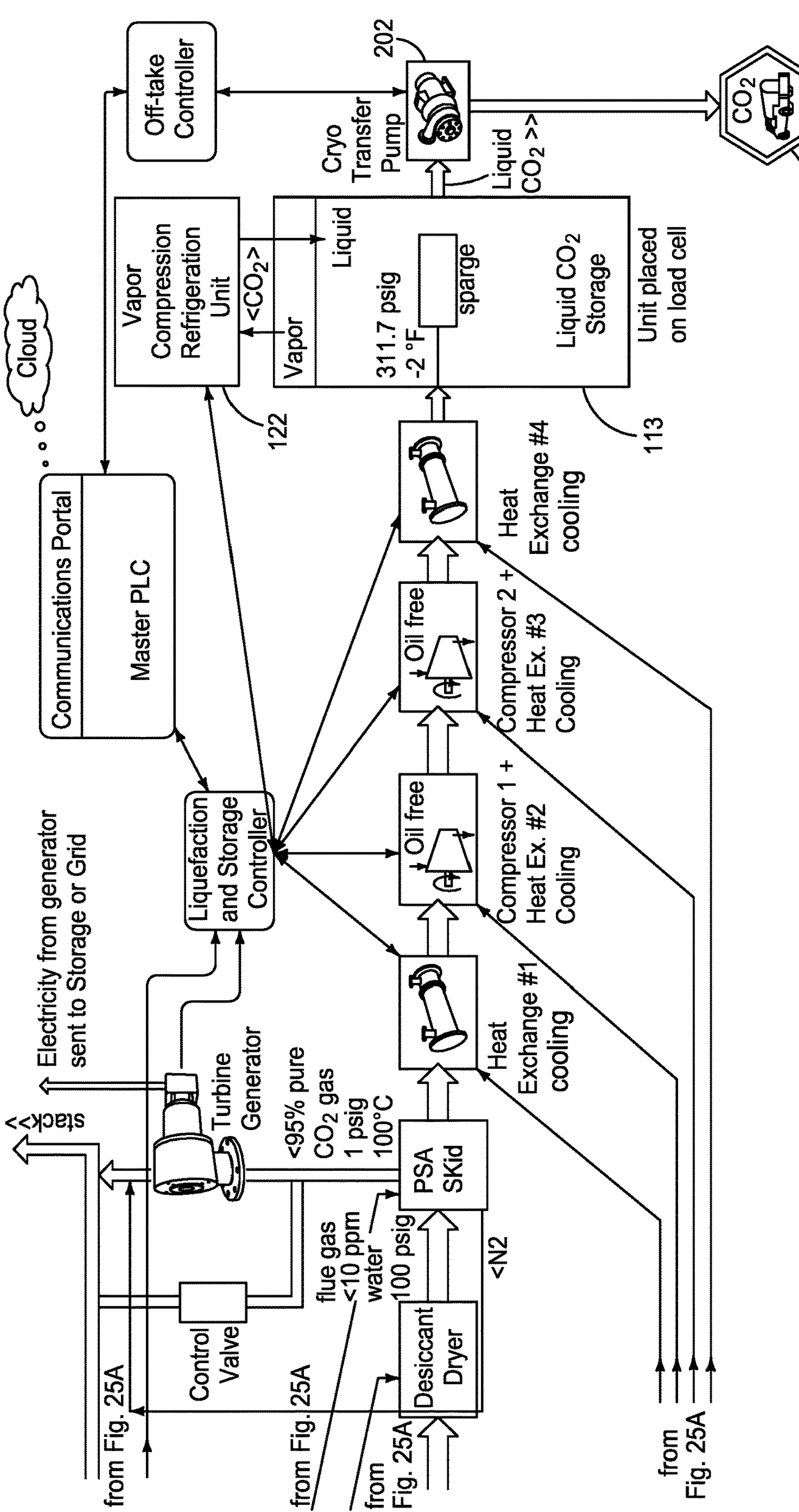

FIG. 25B is another portion of the carbon dioxide capture method and/or system of FIG. 25A according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
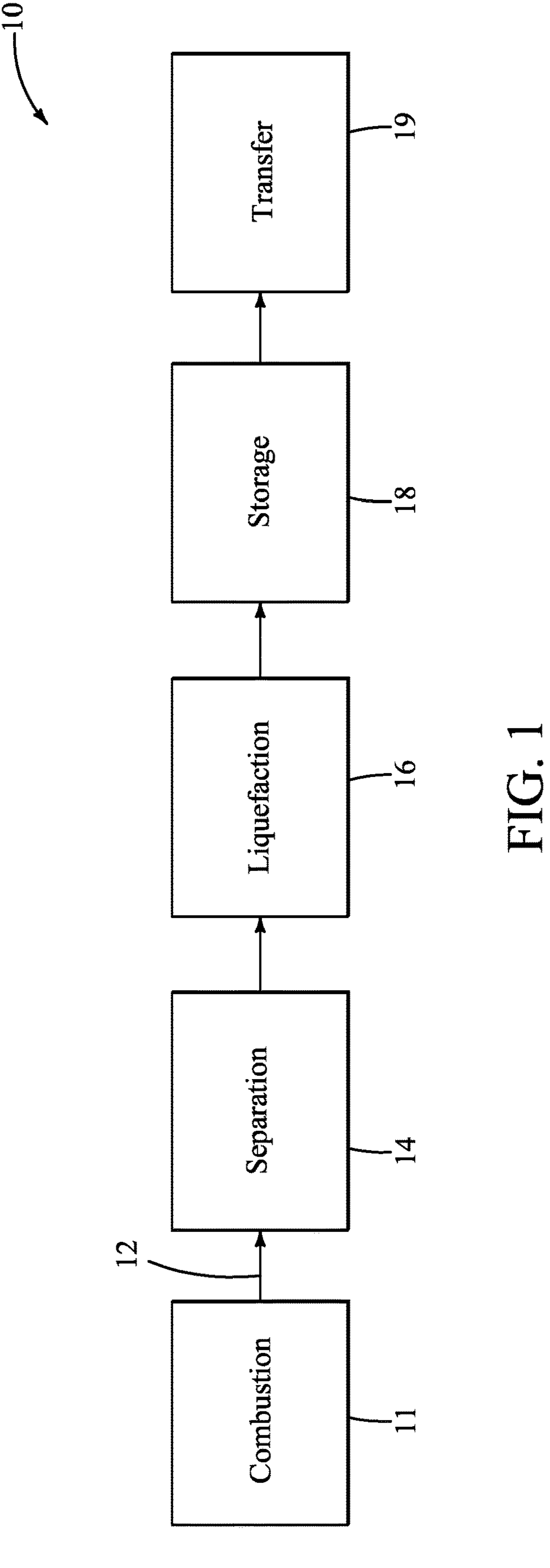
FIG. 1 is a carbon dioxide capture method and/or system according to an embodiment of the disclosure.

The present disclosure will be described with reference to FIGS. 1-25B. The systems and methods of the present disclosure can be operated unattended and/or continuously within a building for up to ten years with only minor periodic maintenance. Referring first to FIG. 1, a system 10 is provided that includes a source of flue gas, such as a boiler that combusts air and fuel to produce flue gas. Flue gas 12 can include typical combustion products from heating and/or cooling systems of a building. These buildings can be considered buildings that are commercial, residential, and/or industrial. System 10 can rely on combustion of fossil fuels. These fossil fuels can include oil, and/or natural gas. Upon combustion of fuel, $CO_2$ as part of flue gas can be produced. In the case of natural gas combustion, system 10 can generate at least about 10% $CO_2$ and about 18% water. Systems and/or methods of the present disclosure can include a portion 14 for separation, a portion 16 for liquefaction, a portion 18 for storage, and a portion 19 for transfer of $CO_2$.

In accordance with example implementations, at least about 600 standard cubic feet per minute of building flue gas can be diverted to the flue gas process stream where $CO_2$ is separated and purified in component 14 of system 10. This separation/purification component can be an adsorption purification system, operated under conditions of Pressure Swing (PSA), Vacuum Pressure Swing Adsorption (VPSA); Temperature Swing (TSA), or Electrical Swing (ESA), or any combination thereof. In accordance with example implementations, it can be a Pressure Swing Adsorption system that is a multicomponent adsorption system that includes multiple vessels containing layered solid phase adsorbent materials coupled and/or configured to work in concert to provide greater than 85% $CO_2$ recovery. These multicomponent adsorption systems can remove carbon dioxide from an essentially "dry" flue gas stream to a purity of greater than 95% in most cases, and in other cases, at least 99%. This purified carbon dioxide gas can then be liquified with successive cooling and compression steps to effect phase change to form liquid carbon dioxide in liquefaction component 16, and then providing that liquified carbon dioxide to a storage component 18 for scheduled removal as desirable. In accordance with example implementations, this liquified carbon dioxide can be transferred away in transfer component 19, and the transfer can be provided to another source such as a storage facility which can distribute the carbon dioxide for use in applications such as concrete curing, waste water treatment, other carbon dioxide sequestration methods, recycled for fire suppression systems, industrial specialty gas, consumed in production of hybrid fuels and organic intermediate chemicals, or for beverage carbonation, as a few examples.

Figure 2:
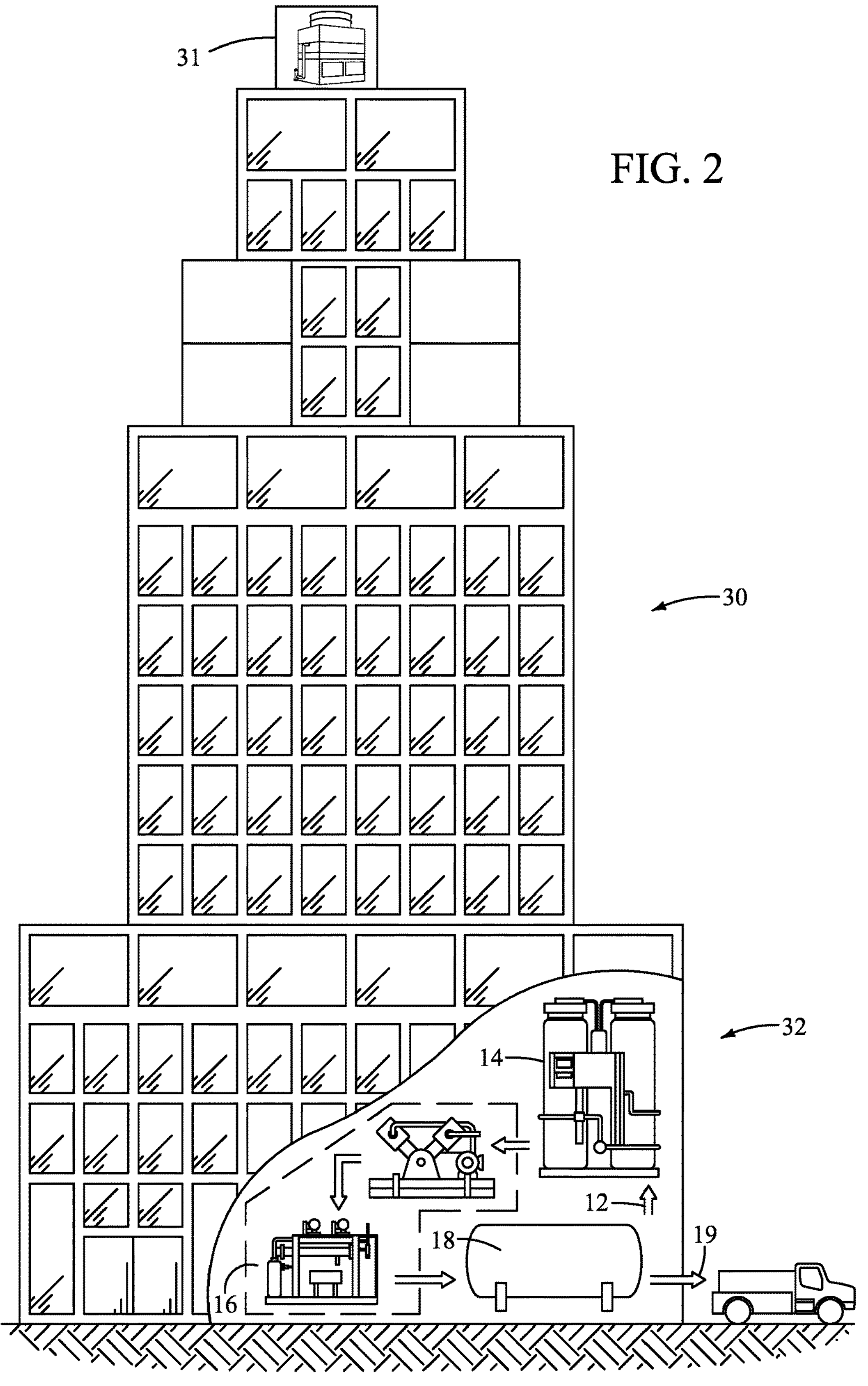
FIG. 2 is a carbon dioxide capture method and/or system according to another embodiment of the disclosure.

Referring next to FIG. 2, a building system 30 is shown having system 32 therein. Flue gas 12 is provided to a series of portions of system and/or methods 14, 16, 18, 19 and/or cooling tower 31 for the capture of $CO_2$ from flue gas generated by the building.

Figure 3A:
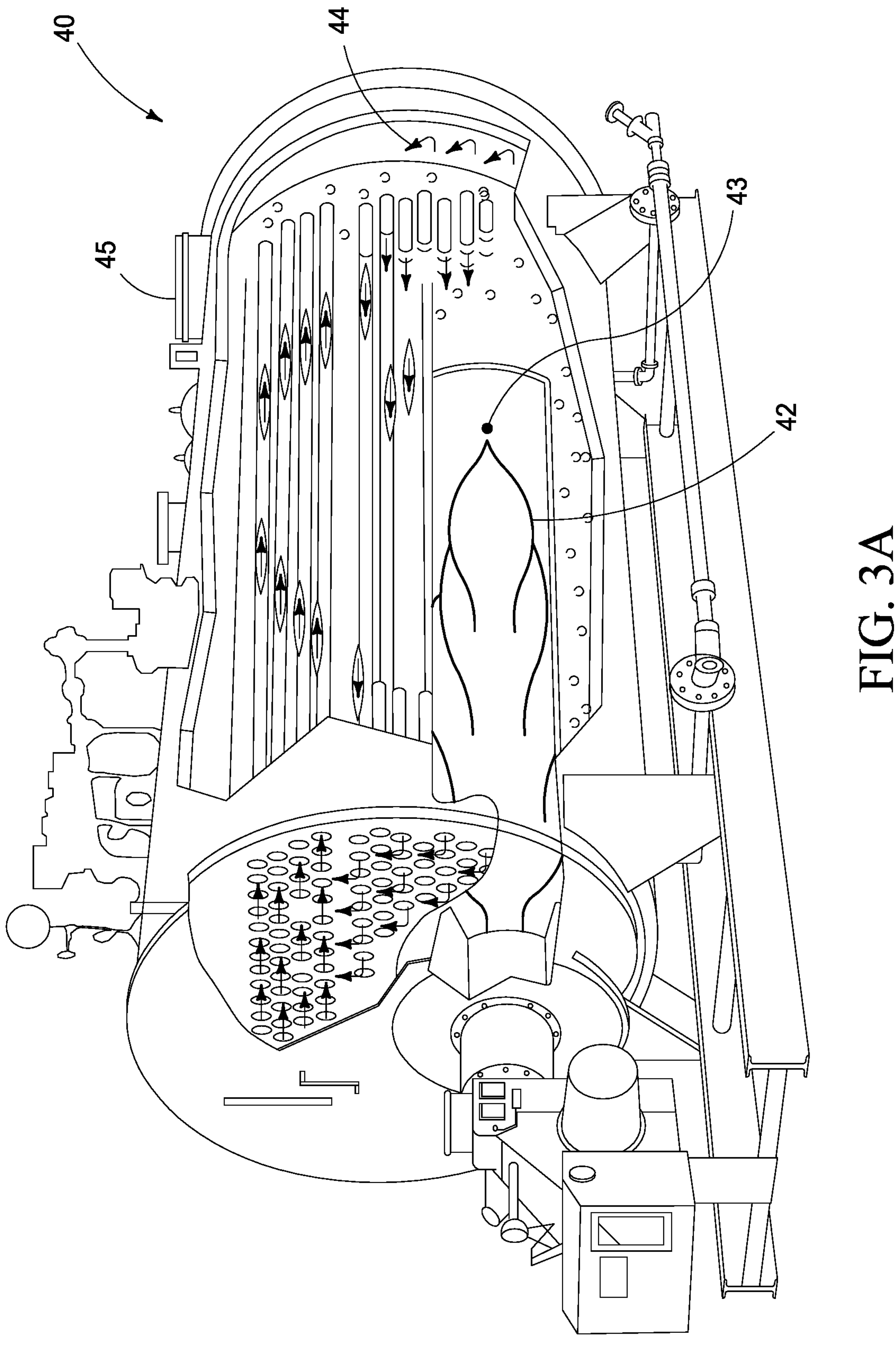
FIG. 3A is an example boiler equipped with a free oxygen sensor according to an embodiment of the disclosure.
Figure 3B:
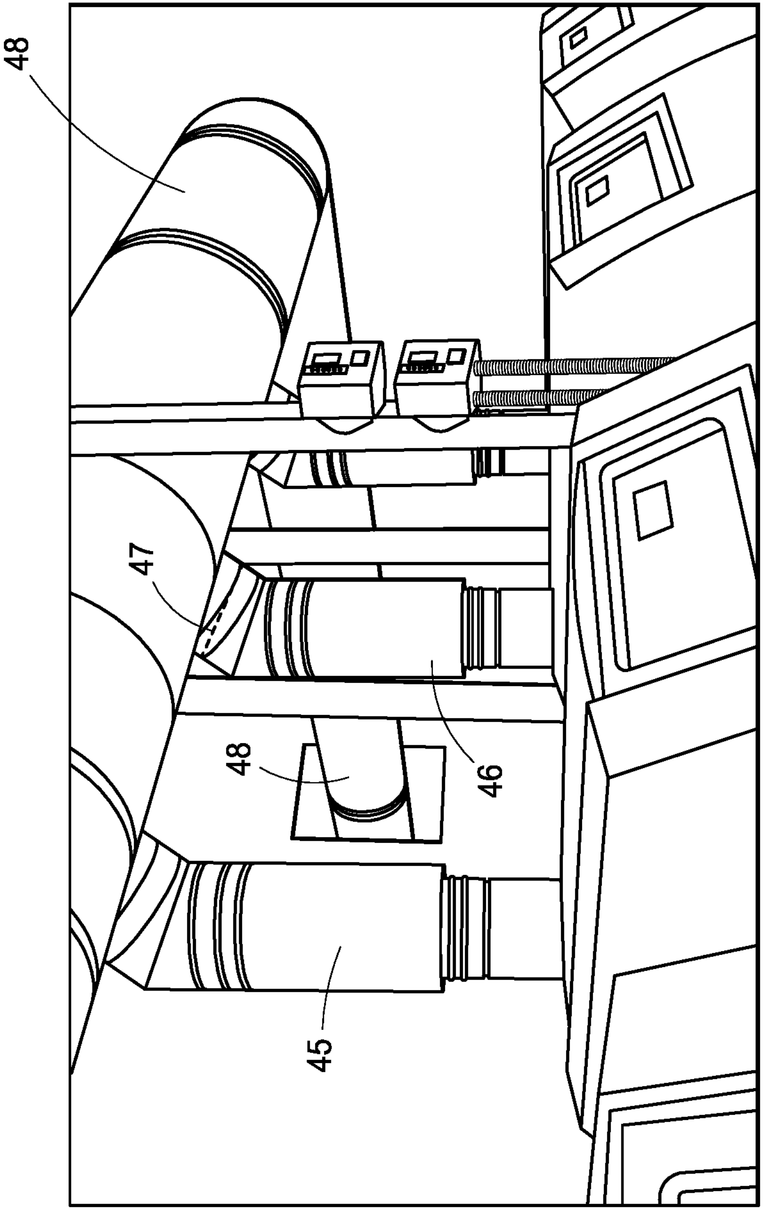
FIG. 3B is a configuration of example boilers operably coupled to a plenum according to an embodiment of the disclosure.
Figure 3C:
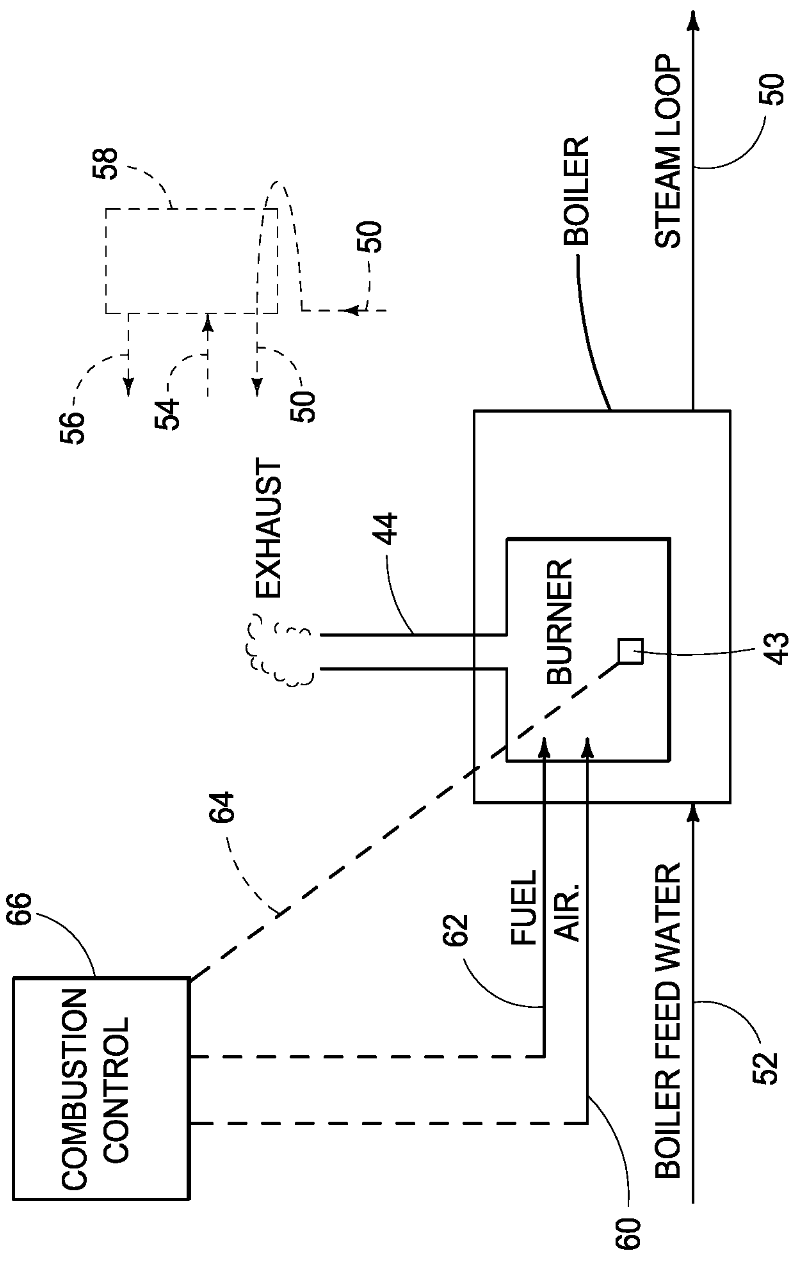
FIG. 3C is an example boiler equipped with a free oxygen sensor according to an embodiment of the disclosure.

Referring next to FIGS. 3A-3C, example boiler configurations are shown as part of the systems and/or methods of the present disclosure. Referring first to FIG. 3A, a boiler 40 is shown generating combustion 42 in the presence of a free oxygen sensor 43. Combustion 42 generates flue gas 44 which is provided to a boiler exhaust 45. Referring to FIG. 3B, boiler exhaust is operatively coupled with a plenum 48. In this depicted configuration, multiple boilers are shown, each with an exhaust 45 and 46, for example, each exhaust operatively coupled to plenum 48.

Referring next to FIG. 3C, a boiler configured with the systems and/or methods of the present disclosure is depicted. Accordingly, air 60 and fuel 62 can be provided to the combustion burner, the mix of which and accordingly the burn of which is controlled by combustion controller 66 which is operably connected with free oxygen sensor 43. Accordingly, boiler feed water 52 is received by the combustion boiler and heated to hot water or steam 50 which is used to heat the building and/or building systems such as water heater 58. Water heater system 58 can be configured to receive potable water for heating and/or industrial process water for heating.

In accordance with example implementations, control 66 can utilize sensor 43 to monitor the amount of free oxygen in the combustion burner and maintain the amount of free oxygen to about 3%. About 3% free oxygen can include free oxygen from 3 to 7%. In accordance with example implementations, combustion can generate flue gas 44. The composition of (wet) flue gas 44 can be controlled to include at least about 8% carbon dioxide. About 10% carbon dioxide can include carbon dioxide from 9 to 11% of the flue gas (dry basis) from combustion of natural gas. System 10 can be utilized to combust fuels other than natural gas which may dictate other optimal $CO_2$ flue gas concentrations. Accordingly, system 10 can be configured to utilize multiple fuels.

The systems and/or methods of the disclosure can include separating the carbon dioxide from the flue gas, liquefying the carbon dioxide after separating the carbon dioxide from the flue gas, liquefying the separated carbon dioxide after separating the carbon dioxide from the flue gas, storing the carbon dioxide after liquefying the carbon dioxide, and/or transporting the carbon dioxide after storing the carbon dioxide.

Referring to both FIGS. 3B and 3C, systems and/or methods for operating the combustion boiler within the building are provided that can include combusting air and fuel within the burner to produce flue gas 44 having an oxygen concentration; and restricting air from the flue gas by substantially eliminating tramp air within the conduit operably aligned to convey flue gas from the burner. In accordance with example implementations, in the case of multiple boilers as shown in FIG. 3B, exhausts 45 and 46 can be operatively aligned with plenum 48. Exhausts not in use, such as 46, can be a source of tramp air to the plenum. In accordance with example implementations, the systems and/or methods of the present disclosure can include providing fluid communication between the operating burner of one boiler and the plenum while restricting fluid communication between the plenum and an idle burner of the other operating boiler. In at least one configuration, a door or divider 47 can be provided and operable to eliminate tramp air from the exhaust of the idle burner.

In accordance with at least one aspect of the present disclosure, real time control of the combustion source, or boiler, can achieve higher efficiency to reduce consumption of natural gas or fuel, for example, while increasing the concentration of carbon dioxide in the flue gas. This may be considered counter intuitive to increase the concentration of carbon dioxide in the flue gas when the systems and/or methods of the present disclosure are being utilized to reduce carbon emissions from a building. However, increasing carbon dioxide concentration can provide the benefit of decreasing fuel consumption by reducing heat loss through the exhaust. Adjusting combustion to control free oxygen to 3% can give a higher efficiency burn. In accordance with example implementations, through combustion control, it is desirable to approach the 12% concentration value of $CO_2$, when burning natural gas, and achieve at least about 10% carbon dioxide concentration in the flue gas (dry basis). This is at least one feature of the disclosed building emission processing systems and/or methods and can be utilized as one of the initial steps in carbon capture.

Within the building, boiler operation can be dictated by responding to the need for hot water or steam by controlling the combustion burner to various predetermined firing rates; 1) an off condition, 2) a low fire rate, and/or 3) a high fire rate. These rates may have been established on older boilers through calibrated mechanical linkages, for example. Recognizing that cyclic boiler operation will vary widely from hour to hour, day to day, and season to season, it is desired to establish automatic control of the flame rate continuously across the entire boiler load range, while also controlling free oxygen as discussed above. The systems and/or methods of the present disclosure can be configured to reduce on-off cycles by extending boiler run time at a reduced flame rate, increasing the life on the boilers, and providing a more continuous flow of flue gas to the separation, liquefaction, storage and/or transport systems and/or methods of present disclosure.

Accordingly, the boiler and system controls (for example FIG. 24) can achieve higher building thermal efficiency, while creating optimal conditions for flue gas supply to the systems and methods of the present disclosure.

Figure 4:
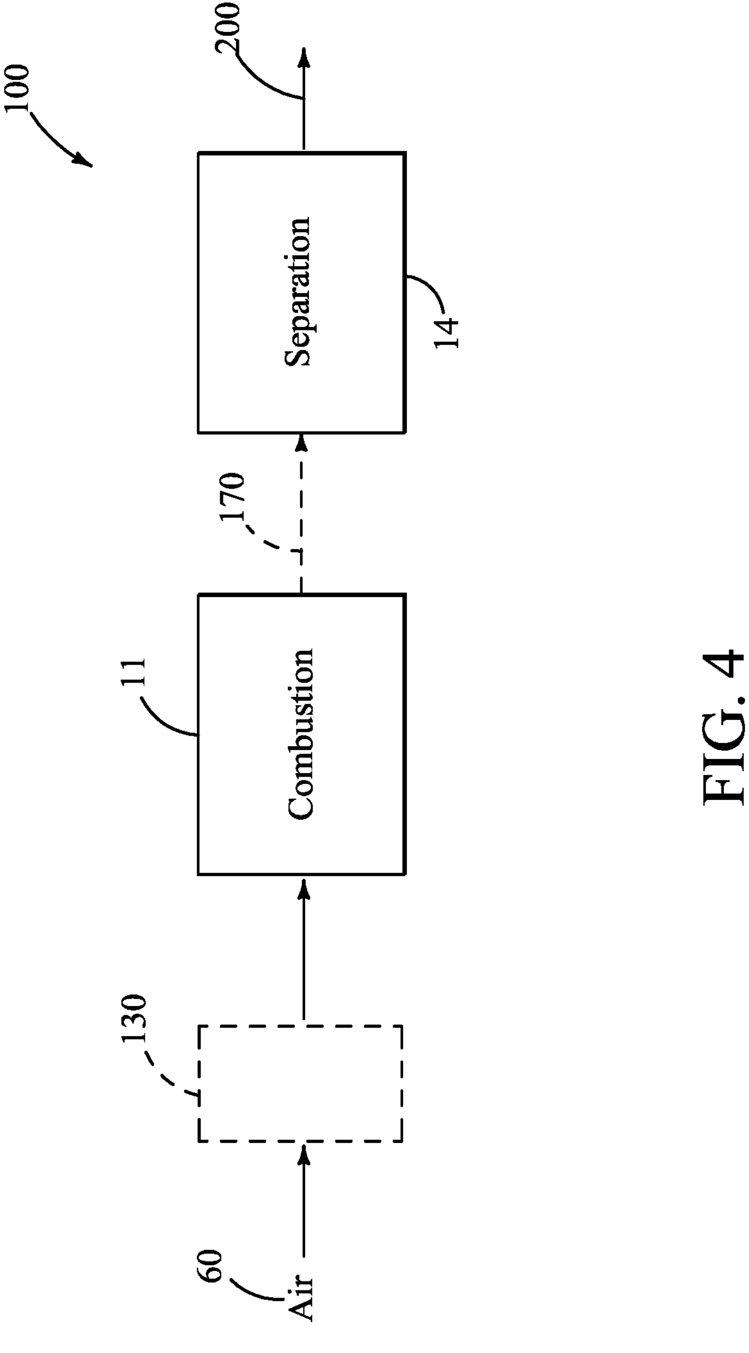
FIG. 4 is a depiction of a combustion assembly and a separation assembly in series according to an embodiment of the disclosure.

Referring to FIG. 4, an assembly 100 is shown that includes a combustion assembly 11 that may or may not be in fluid communication with a separation assembly 14. FIG. 1 can be viewed in the context of U.S. Patent Application Publication No. US 2020/0340665 which was published Oct. 29, 2020, the entirety of which is incorporated by reference herein.

In accordance with example implementations, combustion assembly 11 can have air enrichment performed before receiving air for combustion utilizing air enrichment assembly 130. Air 60 can be provided and enriched prior to use in combustion assembly 11. Combustion assembly 11 can generate an exhaust gas mixture 170 that can include carbon dioxide. Mixture 170 can be provided to separation assembly 14, after additional treatment for example. Upon example treatment, mixture 170 can be sufficiently dry to have carbon dioxide separated out in separation assembly 14. Separation assembly 14 can provide separated gas mixture 200 that includes a substantially higher concentration of carbon dioxide than is provided to the separation assembly.

Referring next to FIG. 5, an example combustion system is shown that includes a burner that is configured to receive enriched air 210 and provide air 60 through an enrichment assembly 130. In accordance with example implementations, the burner and/or the air and/or fuel being provided to the burner can be controlled by a combustion controller (not shown) to heat water that is part of a steam loop. This combustion assembly can generate an exhaust 44 such as a flue gas.

Referring next to FIG. 6, a more detailed view of a membrane enrichment assembly 130 is shown that includes air 60 entering membrane assembly 170. Membrane assembly 170 can be configured as a bundled hollow fiber membrane. Example membrane assemblies can include SEPURAN® (Evonik Industries AG, Rellinghauser Straße 1-11 45128 Essen Germany) and/or custom assemblies (UniSieve Ltd, Regina-Kägi-Strasse 11, CH-8050 Zurich, Switzerland). These membrane assemblies can include multiple membranes, for example 3-5 membranes.

As can be seen, air 60 can enter membrane assembly 170, and this air can include oxygen from 21%; and nitrogen 78.5%. Exiting as the retentate mixture 160 can be a stream that is substantially nitrogen in the range from about 90% to 95%, but proceeding to another stream as permeate mixture 140 can be a stream that is oxygen in the range from about 36% to 43%, with less nitrogen contained therein (58-64%). In accordance with example implementations, permeate mixture 140 can be provided to enrich air stream 60 at mixing system 180 which can be configured as a valving system and/or plenum system to form enriched air mixture 210. Enriched air mixture 210 is higher in oxygen concentration than standard air and can continue to the burner for combustion.

Referring to FIG. 7, more details are provided for additional embodiments of the enrichment of air for combustion. Accordingly, air 60 can be compressed and provided to membrane assembly 170 wherein assembly 170 provides an $N_2$-rich stream 160 and an $O_2$-rich stream 140. Using a flow controller, the $O_2$-rich stream 140 can be mixed in a mixing system 180 with air 60 to provide enriched air 210 to a boiler burner via a boiler blower, for example. In accordance with example implementations, $N_2$-rich stream 160 can be operably coupled to a turbo expander and/or a vortex tube for the generation of power and/or warm/cool $N_2$ as needed. This is just one example of the turbo expander and/or vortex tube being coupled to a high pressure $N_2$ source.

In accordance with example implementations, providing enriched air to the combustion assembly can reduce the amount of nitrogen in the exhaust or flue gas, thereby reducing the amount of nitrogen that may need to be processed when separating carbon dioxide from the nitrogen.

Referring next to FIGS. 8A-C, multiple portions of systems and methods are depicted for separating water from flue gas as well as cooling the flue gas. Referring first to FIGS. 8A-8C, three different configurations of systems and/or methods for cooling flue gas from a combustion boiler within a building are depicted. Referring first to FIG. 8A, flue gas 44 can proceed to a combination non-condensing and condensing economizer 60*a*. Flue gas 44 first proceeds to a non-condensing configuration in which boiler feed water 52 is provided through a conduit, set of conduits, and/or coils and flue gas is cooled and the boiler feed water heated. Accordingly, methods for cooling flue gas from a combustion boiler within a building are provided. Upon heating the boiler feed water, it can be provided to the boiler thus lowering the necessary energy required to heat the feed water to hot water and/or steam.

Additionally, the economizer can be configured for condensing. Accordingly, a conduit, set of conduits, or coils 54 can be configured to convey potable or industrial process water that is received from a utility for example. This water can have the temperature close to that of ground water as it is conveyed through typically underground pipes. Accordingly, the water has a substantially different temperature than the flue gas, even after being partially cooled in the non-condensing economizer. The providing of the flue gas to these conduits can remove water from the flue gas thus creating a water condensate effluent 53. This water proceeding through the conduits can be heated and provided to a water heating system 58 (FIG. 3C) as water heating system water intake 54, heated and received through outlet 56. Accordingly, the amount of energy needed to heat the water within water heating system 58 is less for at least the reason the water received for heating does not need to be heated from the lower temperature associated with typical utility water, rather it had been preheated. In accordance with an alternative configuration, and with reference to FIG. 8B, one set of coils 52 can be associated with one economizer 60*b*, and another set of coils 54 can be associated with another economizer 65*a*. In this configuration, economizer 60*b* can be a non-condensing economizer and economizer 65*a* can be configured as a condensing economizer. In accordance with another embodiment of the disclosure, a diverter 64 can be operably coupled to the economizers as shown in FIGS. 8A-8C. In accordance with example implementations, the cooled flue gas can be provided from diverter 64 using a blower. The systems and/or methods can control the amount of flue gas to be processed using the diverter. In accordance with example implementations, the current system in accordance with FIG. 8C is going to receive 450 Standard Cubic Feet per Minute (SCFM) to 500 SCFM of wet flue gas 44. This diverter can be controlled by the overall master system (FIG. 24) which can control the motor operated butterfly valve within the diverter. The master system can also collect gas temperature and flow data, and operate the blower as shown in FIG. 10.

Accordingly, where an economizer is down process stream from a diverter, a blower may precede the economizer. In accordance with example implementations, the wet flue gas is at least about 8% carbon dioxide and/or at least about 3% free oxygen prior to entering the first economizer. The systems and/or methods of the present disclosure can utilize economizers configured as shown in FIGS. 9A and 9B for example, and the methods can include additional separation as well as liquefaction, storage, and transport.

It has been determined that flue gas from the boiler may have a water content of approximately 18%, and a temperature ranging up to 350° F. Prior to separation of $CO_2$, this water can be substantially removed from the flue gas. This involves dropping the flue gas temperature below dewpoint and allowing water to condense out as a liquid. As the water content of the flue gas lowers, so does the dewpoint, requiring yet additional cooling to continue removing the water. This cooling can result in flue gas condensates.

Flue gas condensates tend to be slightly acidic (at pH<=5) which is a condition that can damage some building plenums due to construction materials (such as carbon steel) which are not acid resistant. In these cases, gas must be removed from the plenum and condensed in external heat exchangers having acid resistant stainless steel components. Additionally, depending on condenser design, some amount of micro-liquid droplets may remain in the gas stream. These micro-liquid droplets can be referred to as acid aerosols which can be present at ppm levels. The present disclosure contemplates the removal of acid aerosols. These systems and/or methods include wet wall heat exchangers, impingers or mists eliminators with inert reticulated carbon or metal foam, and precipitators for example.

In accordance with the above, the non-condensing economizer can operate above dew point temperature, preventing any liquid condensate from forming. Without condensation, this economizer can be compatible with most plenum construction materials.

As described above, a condensing economizer can be provided downstream of the diverter (FIG. 8C) which extracts flue gas from the plenum and directs it on to the condensing economizer. Condensate from this condensing economizer can be chemically neutralized before proceeding to the building drain as shown by 75 in FIG. 10.

Referring next to FIG. 10, flue gas drying can continue with a blower 68 to increase pressure of flue gas from the diverter. This blower 68 can support flow through the heat exchanger/condenser 70 which can include a water outlet 71 operatively coupled to an acid neutralizer assembly 75. Heat exchanger 70 can be configured to cool the gas below dewpoint to condense out most water leaving less than about 3% water or as low as approximately 0.2% water.

Heat exchanger 70 can be a tube and shell configuration, cooled by an external water/glycol loop provided from a chiller and/or water from the building cooling tower for example. As shown, the water removed from the system at heat exchanger 70 can be slightly acidic, and it is anticipated that the water can be neutralized before proceeding to a Publicly Owned Treatment Works (POTW) or through a sewer system. Additionally, some water will remain in the process stream as small micro droplets, mist, or acidic aerosols which will be minimized or removed with special heat exchanger designs, mist eliminator, impingement devices, or possibly a precipitator. These components may produce additional condensate or effluent which can be treated before proceeding to a POTW.

After a preponderance of water has been removed, and acidic aerosols mitigated, the cooled flue gas 72 can continue on to a compressor to increase pressure of the flue gas to an optimum level of approximately 100 psig, or lower, as dictated by the PSA system specification. Since compression raises process gas dew point, the compressor may produce additional condensate or effluent.

Referring next to FIG. 11, compressor 74 can receive flue gas 72. Compressor 74 can be an "oil free" compressor to eliminate downstream product contamination, and the compressor can be configured with variable frequency drives (VFD's) to respond to variable gas flows. Compression can raise the temperature and dew point of the flue gas, so a second heat exchanger 76 can be utilized to lower the temperature of the flue gas to less than 40° C. At this stage, the gas can have less than about 0.2% water which can exist as a vapor, the gas can be less than 40° C. temperature, and can be about 100 psig in pressure.

Referring to FIG. 11, the systems and/or methods for separating carbon dioxide from flue gas generated from a combustion boiler within a building can include providing flue gas 72 having less than about 3% water; compressing the flue gas; and cooling compressor 74 with a heat transfer fluid 90 and providing the heat transfer fluid to/from a chiller and/or a cooling tower.

In accordance with another example implementation, mist eliminator subsystem 89 can be provided which can produce an effluent 53. During water removal from flue gas, liquid condensate as effluent at other points in the process or system can be produced. This effluent can be slightly acidic (approx. 5 pH) and can be neutralized before being provided to the building drain.

A very small amount of this slightly acidic condensate remains entrained in process gas as mist or acid aerosols. In order to remove these liquid micro-droplets, mist eliminator sub-system 89 can be added just prior to the compressor inlet. This subsystem can be an electrostatic unit, wet walled heat exchanger, or a passive impinger arrangement comprised of reticulated metal or carbon foam, wire mesh pad, or other material designed with a tortuous gas path causing mist particles to strike surface areas, nucleate and drain from the system by gravity. By reducing or eliminating acid aerosols, the mist eliminator solution can significantly prevent harmful corrosion in downstream components of the process gas stream. Accordingly, the mist eliminator can produce effluent 53 which can be neutralized and provided to a drain.

Referring next to FIG. 12A, an example implementation of a separation assembly 14 is shown that includes a PSA or Pressure Swing Adsorption assembly 80 that can be configured in line to receive an amount of incoming fluid such as gas, for example having carbon dioxide of 8% to 16%; nitrogen of 86% to 78%. PSA 80 can be configured to separate carbon dioxide from this stream and provide carbon dioxide that is greater than 95% purity.

In this process, PSA 80 can provide a substantially nitrogen stream that is pressurized, and this nitrogen can be provided to one or more assemblies, for example, via stream 42 to a turbine expander 48 as well as to a control valve 50 via stream 44 as shown. In accordance with example implementations, from these assemblies, nitrogen streams 86 can be provided.

In accordance with example implementations, yet another stream 46 can be provided to a vortex tube assembly 52 that receives pressurized nitrogen and provides cold nitrogen 54 and hot nitrogen 56. The present disclosure can be configured to utilize the heat of streams 54 and/or 56 in combination with the operating functions of the system generally and/or of the PSA assembly particularly. This is one example of coupling of the vortex tube to take advantage of pressurized $N_2$ created with the system and/or methods of the present disclosure. As described herein, the vortex tube and/or the turbo expander can be coupled to other components in the system that generate pressurized $N_2$, for example, membrane retentate streams.

For example, and with reference to FIG. 12B, when a PSA assembly is configured to do step cycling, different portions of the PSA include adsorbent that is configured at temperatures and/or pressures to provide for the adsorption or desorption of carbon dioxide when separating nitrogen from carbon dioxide. For example, portion A as 60 can be configured to adsorb carbon dioxide, and thus cold nitrogen 54 can be provided to that portion to further facilitate the adsorption of carbon dioxide during that step cycle. Alternatively, in either a different time step cycle or at a different portion D as 62 of the PSA that is stepped to desorb, hot nitrogen 56 can be provided to warm the adsorbent to desorb the carbon dioxide. Thus, the system can utilize the hot and/or cold nitrogen that is provided from the pressurized nitrogen of the PSA as thermal energy to facilitate a more efficient PSA separation.

An example a vortex tube assembly 300 is depicted in FIG. 13 that includes an input 302 that is configured to receive compressed nitrogen and provide cold nitrogen at exit 304 and hot nitrogen at exit 306.

Referring next to FIG. 14, a more detailed view of a thermal exchange is shown wherein the cold nitrogen can be provided to a heat exchanger as part of a portion of a PSA, and the hot nitrogen can be provided to another portion. These portions can be regulated to provide thermal energy during the in-sync step cycle of the Pressure Swing Adsorption to separate carbon dioxide from the incoming gas. In accordance with example implementations portions of the PSA adsorbent can be in thermal communication with a heat exchange assembly that is configured to receive either or both of cold nitrogen or hot nitrogen from the vortex assembly (e.g., as part of the step-cycling of PSA). As shown, vortex exits can be provided with valves to control the flow of hot or cold nitrogen to the heat exchangers that are in thermal communication with the adsorbent.

An example compressor is depicted in FIG. 15. The heat transfer fluid can be water for example, and the water of the chiller can be cooled within a cooling tower of the building before returning spent heat transfer fluid to the chiller. Accordingly, the systems and/or methods of the present disclosure can include additional separation, liquefaction, storage, and/or transport. This is just one example of the heat generating components of the system that can be cooled with chiller and/or cooling tower heat transfer fluid. Over 70% of the cooling requirement for the systems and/or methods of the present disclosure can come from heat generated in compressors and/or pumps, and from heat exchangers on the liquefaction skid. Each of these components can be provided with a water cooling circuit supplied from a local chiller or directly from the central chiller. The local chiller can be water cooled with a water loop coming from the central chiller or from cooling water from the building cooling tower. The central chiller can be designed to prioritize heat transfer in the following order: a) domestic hot water makeup; b) cooling tower; c) exchange with outside air, for example.

Referring again to FIG. 11, after compression the flue gas can be provided to a dryer 78, such as a desiccant dryer. Dryer 78 can be operatively engaged with a nitrogen feed, such as a sweep feed, configured to regenerate spent desiccant. Typically, the dryer is a two-chamber cycling device, wherein one chamber is drying while the other chamber is re-generated for drying, and those cycles continue. The nitrogen can be provided to spent desiccant in one chamber while the other chamber is drying flue gas. Accordingly, systems and/or methods for separating carbon dioxide from flue gas generated from a combustion boiler within a building are provided that can include drying the flue gas using nitrogen recovered during separation of carbon dioxide recovered from the flue gas. This recovered nitrogen can be conveyed from the pressure swing adsorption assembly 80 via conduit 92 to dryer 78 and then exhausted through the stack 86. In accordance with example implementations, the dried flue gas can be provided for additional separation, liquefaction, storage, and/or transport.

From the dryer, the flue gas 79, containing less than 10 ppm water, can proceed to pressure swing adsorption (PSA) assembly 80. This pressure swing adsorption assembly can provide greater than 85% $CO_2$ recovery, at greater than 95% purity, at 1 psig, from ambient to about 100° C. Maximum $CO_2$ output flow at this point can be approximately 40 SCFM. The remainder of the flue gas, mostly nitrogen may continue under pressure, and/or be split with a portion returning to dryer 78. Another portion of the nitrogen can proceed to a turbine expander 82/generator 93 which can provide electrical energy 94 and a cold output gas, at near ambient pressure. Additionally, a control valve 84 equipped with a silencer can be operationally aligned in parallel with expander 82/generator 93.

Accordingly, methods for separating carbon dioxide from flue gas generated from a combustion boiler within a building are provided that can include removing at least some of the nitrogen from the flue gas to produce greater than about 95% carbon dioxide 78 using a pressure swing adsorption assembly 80. Nitrogen removed from the flue gas can be used to remove water from the flue gas before providing the flue gas to the pressure swing adsorption assembly, in dryer 78, for example. Alternatively, or additionally, at least some of the nitrogen removed from the flue gas can be provided to a gas expander/generator. Alternatively, or additionally one part of the nitrogen from the PSA can be provided to a control valve equipped with a silencer and providing another part to the expander/generator. In accordance with example implementations, the systems and/or methods of the present disclosure can include separating the nitrogen into parts and providing one part to the dryer and another part to the expander/generator. In one example implementation, the one part is about a third of the nitrogen from the pressure swing adsorption assembly.

In accordance with an example implementation, during the PSA process a small amount of rejected gas can be produced containing both $CO_2$ and nitrogen. Rather than purging this gas it can be recycled back through the compressor via recycle line 81 in order to enhance the overall recovery of $CO_2$.

Systems and/or methods are also provided for cooling carbon dioxide separated from flue gas generated from a combustion boiler within a building using the nitrogen exhaust of a PSA. The systems and/or methods can include separating nitrogen from flue gas using pressure swing adsorption assembly 80, and expanding the nitrogen through a turbine within the presence of a heat exchanger 92 to cool fluid within heat exchanger 92; and transferring that cooled fluid to another heat exchanger 100 operably aligned with the carbon dioxide product of the pressure swing adsorption assembly to cool the carbon dioxide product 78. The turbine can be part of a generator 93, for example, or may be provided to cool exchanger 92.

Typically, the nitrogen gas exiting the PSA can be at least 85 psig. with a flow exceeding 80% of the rated system flow. In accordance with example implementations, the nitrogen may be processed and saved as a marketable product. With regard to the electricity generation, grid compatible power conversion will be needed. The turbine generator will have a 500 Hz output which is not compatible with a 60 Hz grid. Therefore, it is envisioned that appropriate power conversion will be specified. This can be rectification followed by DC to AC multi phase inverter with proper safety features in case of a building power outage. After use in the turbine generator, and in the $CO_2$ heat exchanger, the nitrogen waste gas can proceed back to the exhaust stack or plenum.

Referring to FIGS. 16A-16D, different embodiments of $CO_2$ separation systems and/or methods are depicted that can be used alone or in combination with some or all of the components of the systems and/or methods of FIG. 1.

For example, referring to FIG. 16A, an electrochemical cell is shown that includes a cathode configured to receive for reaction $CO_2$ and $O_2$. This $CO_2$ and $O_2$ may be received from the same or different streams. For example, the $CO_2$ can be received from a flue gas stream or may be received from an air stream. The flue gas stream may be $CO_2$ and $N_2$, it may also contain $O_2$, it may also contain $H_2O$ in a range of concentrations. For example, the stream may be considered wet or dry, with a wet stream containing $H_2O$ from the combustion process that generated the flue gas. The $O_2$ may be received as part of a flue gas stream, an air stream and/or as part of an $O_2$ stream.

Exiting the cathode side of the cell can be an $N_2$ stream. This $N_2$ stream may also contain $CO_2$ that did not react to form carbonate ion ($CO_3^{2-}$). For example, it may contain $CO_2$, $H_2O$, and/or $O_2$. This $N_2$ stream will contain less $CO_2$ than the stream exposed to the cathode.

Upon exposure to the cathode and electrical coupling, the $CO_2$ is reacted to form the carbonate ion which is conveyed through the carbonate electrolyte to the anode where the electrical coupling returns the $CO_3^{2-}$ to $CO_2$ and $O_2$ as a $CO_2$ product. As will be detailed below, this system can be implemented in a variety of ways; for example, as a carbonate ion pump (FIG. 16B), as flue gas carbonate fuel cell (FIG. 16C), and/or as fuel cell (FIG. 16D). In one or more of these implementations, $CO_2$ can be removed/separated/sequestered from one or more streams.

For example, and with reference to FIG. 16B, a portion of a carbon dioxide capture method and/or system is shown configured with a carbonate ion pump. As shown, the carbonate ion can be produced electrochemically on the surface of a cathode electrode by reacting carbon dioxide and oxygen from the air in the presence of electrons. The $CO_2$ can be obtained from flue gas in wet or dry form, and the $O_2$ can be part of the flue gas or provided from an $O_2$ source, from air for example. The flue gas can contain $N_2$ which will not react at the cathode and proceed to the gas stack along with any other components that did not react (e.g., $H_2O$, $O_2$, $CO_2$).

The electrochemical equation is: $CO_2+½O_2+2e^-\rightarrow CO_3^{--}$. Multiple cells can be configured into stacks whereby $CO_2$ and $O_2$ are supplied through respective manifolds.

Once the carbonate ion is produced at the cathode, a solid or liquid electrolyte can be in ionic communication with the cathode providing a pathway for carbonate ions to move to the associated anode. This electrochemical activity is the basis for forming and transporting carbonate ions and for separating $CO_2$ from the original cathode gas mixture.

Upon reaching the anode, electrons can be removed from the carbonate ion(s) causing dissociation back to $CO_2$ and $½O_2$.

In accordance with another implementation of the present disclosure, $CO_2$ can be separated from flue gas using a membrane alone or in combination with other separation techniques. The membrane separation can utilize solvent absorption and/or polymeric based membranes with appropriate permeability and selectivity for $CO_2$. The polymeric membranes can include mixed polymeric membranes as well. Additional membranes can include carbon and/or inorganic membranes. $CO_2$ separation can be performed using membranes configured to perform Knudson diffusion, molecular sieving, solution-diffusion separation, surface diffusion and/or capillary condensation.

As shown in FIGS. 16B-16D, $O_2$ can be generated from the $CO_2$ product stream, for example during liquefaction. This $O_2$ can be provided to the cathode as part of the $O_2$ source. The amount of the $O_2$ being provided to the cathode can be monitored and/or adjusted as desired to operate the cell for optimal $CO_2$ separation.

In accordance with one embodiment of the disclosure and with reference to FIGS. 16C-16D, a carbonate fuel cell configuration can be provided with fuel, particularly hydrocarbon fuel sufficient to form syngas ($H_2$ and CO). The syngas can be formed from natural gas ($CH_4\rightarrow H_2$ and CO), and/or other hydrocarbon materials including, but not limited to coal. The cathode can be exposed to $CO_2$ and $O_2$ as described above to form the carbonate ion which can be exposed to the syngas at the anode to form $CO_2$ and $H_2O$ as well as electrons to provide power output in the form of heat and electricity. This system can be part of a building design, replacing a power generator or boiler within a building, and/or as a stand alone system to provide heat and power.

The natural gas can be provided as part of the fuel cell and this natural gas can be tapped into from the intake to an existing building. Accordingly, while using natural gas which can be directly reformed to syngas at operational temperatures, heat and power can be generated electrochemically and this heat and power can be provided to the building thereby offsetting part or all of the building's thermal and power needs without natural gas combustion, thus, drastically reducing $CO_2$ emissions.

For example, the system can be paired with a common boiler system that is configured to combust natural gas. Accordingly, both the boiler and the system of the ion pump can be configured to receive natural gas. Therefore, the system of FIG. 16C can provide heat and electrical power while the boiler provides thermal power in the form of steam. The system of FIG. 16C can be operationally aligned with $CO_2$ capture and purification systems as well.

Accordingly, the fuel cell can receive flue gas at the cathode and $CO_2$ is electrochemically purified and made available for separation and liquefaction. As shown, flue gas can be provided though a tortuous path to maximize $CO_2$ exposure to the cathode electrode surface area. This flue gas may be provided directly from the combustion boiler or it may be treated as described with reference to FIGS. 8-11 prior to being exposed to the cathode side of the fuel cell. Multiple cells can be configured in stacks with appropriate gas manifolds. This particular embodiment can offer increased performance in higher $CO_2$ concentrations thus allowing for less pretreatment of flue gas before $CO_2$ separation.

Upon reaching the anode, electrons can be removed from the carbonate ion(s) causing reformation of $CO_2$ and $O_2$. In accordance with FIGS. 16A-16D, the stream comprising $CO_2$ and $O_2$ can be provided to liquefaction as described, for example, herein with reference to FIG. 1. Non condensable oxygen can be separated and fed back to the Cathode side of the pump. As shown electrical energy can be provided to operate the pump. The pump can also utilize heat from the flue gas.

Accordingly, while using natural gas which is directly reformed to syngas at operational temperatures, heat and power can be generated electrochemically and this heat and power can be provided to the building thereby offsetting part or all of the building's thermal and power needs and without natural gas combustion.

Accordingly, syngas can be introduced at the anode and carbonate ions react exothermically to form more $CO_2$ and water vapor. At this stage a large substantial amount of the resulting gas can be purified $CO_2$. The concept further teaches removal of water vapor through condensation followed by $CO_2$ liquefaction.

Accordingly, systems for separating $CO_2$ from a combustion product are provided that can include a combustion product stream. This combustion product stream can be a wet stream or a dry stream that contains $CO_2$ and $N_2$, or for example $CO_2$, $O_2$, $H_2O$, and/or $N_2$. The system can include a carbonate ion pump or carbonate electrochemical cell operatively aligned with the combustion stream and configured to react the $CO_2$ and $O_2$ from the combustion product stream to form carbonate ion and react the carbonate ion to form a $CO_2$ product stream.

The carbonate electrochemical cell can include a cathode configured to receive electrons from a power supply and react those electrons with the $CO_2$ and $O_2$ of the combustion product stream to form the carbonate ion. This carbonate ion can be $CO_3^{2-}$, for example and can be a component of a carbonate electrolyte. The cell can also include an anode configured to react the carbonate ion and form $CO_2$, $O_2$ and electrons. Accordingly, the system can include a cathode and anode about a carbonate electrolyte.

In accordance with additional embodiments, an $O_2$ source can be operatively coupled to the cathode of the carbonate electrochemical cell. In this configuration, the cathode can be configured to be exposed to $CO_2$ from the combustion stream and $O_2$ from the $O_2$ source. Further embodiments can utilize a syngas source operatively coupled to the anode to provide a carbonate fuel cell. In this configuration, the anode can be configured to receive the carbonate ion and the syngas and form the $CO_2$ product stream.

The system can include a catalytic burner operatively coupled to the $CO_2$ product stream as well as a heat exchanger operatively coupled to the catalytic burner and configured to remove $H_2O$ from the $CO_2$ product stream. The heat exchanger can be operatively coupled to a heat recovery loop with an additional conduit configured to provide $CO_2$ to the cathode.

Methods for separating $CO_2$ from a combustion product stream can include receiving a combustion product stream comprising $CO_2$ and $N_2$; reacting the combustion product stream to form carbonate ion; and reacting the carbonate ion to form a $CO_2$ product stream. Electrons can be provided to form the carbonate ion, and electrons can be removed to form the $CO_2$ product stream.

Additionally, syngas can be provided to react with the carbonate ion to form the $CO_2$ product stream, and natural gas can be provided to form the syngas. Embodiments of this method can generate a net positive electrical potential upon forming the $CO_2$ product stream.

With reference to FIG. 16D, a system for separating $CO_2$ from air is provided. The system can include an air stream; the air stream can include at least $CO_2$ and $N_2$; and a carbonate fuel cell operatively aligned with the air stream and configured to react the $CO_2$ from the air stream and $O_2$ to form carbonate ion and react the carbonate ion to form a $CO_2$ product stream. An $O_2$ source can be operatively coupled to the cathode of the carbonate fuel cell, with the cathode being configured to react $CO_2$ from the combustion stream and/or $O_2$ from the source. As shown, this $O_2$ source can be from the $CO_2$ liquefaction process. A natural gas source can be operatively coupled to the anode of the carbonate fuel cell, with the anode configured to receive the carbonate ion and the natural gas and form the $CO_2$ product stream.

In some implementations, a portion of $CO_2$ can be returned to the cathode as required, with remaining $CO_2$ sent to liquefaction as described with reference to FIGS. 22-25B.

Referring next to FIG. 17, a portion of system 10 is shown that includes separation assembly 14. Entering separation assembly 14 can be a fluid mixture 12 that is typically in a gas phase. Mixture 12 can include flue gas that may have been processed to remove water. The mixture can typically include an amount of carbon dioxide from 8% to about 16%, and nitrogen from 86% to 82%; balance of oxygen and other trace materials. Exiting separation assembly 14 can be at least one separated mixture 78 that can have a higher concentration of carbon dioxide than the carbon dioxide concentration of mixture 12.

Referring next to FIG. 18, in accordance with example implementations, a membrane separation assembly 1000 is shown that can receive mixture 12 and provide at least two separated streams, a retentate stream 1018 and a permeate stream 1020. Separation assembly 540 can be configured as a bundled hollow fiber membrane. Example membrane assemblies can include SEPURAN® (Evonik Industries AG, Rellinghauser Straße 1-11 45128 Essen Germany) and/or custom assemblies (UniSieve Ltd, Regina-Kägi-Strasse 11, CH-8050 Zurich, Switzerland).

Accordingly, stream 1018 can be higher in nitrogen concentration than mixture 12, and stream 1020 can be substantially higher in carbon dioxide concentration than mixture 12. In accordance with example implementations, membrane separation assembly 540 can have multiple components and multiple configurations that include configurations of flow, temperature, pressure, membranes, and/or stages. The stages can include stages in series, stages that return to stages, and/or stages that allow for the separation to occur at certain flows, pressures and/or temperatures. In accordance with example implementations, this configuration can include a back pressure regulator or control valve 1022 to maintain back pressure on membrane separation assembly 540.

Referring next to FIGS. 19-21, multiple configurations of the membrane separation assemblies 540A and 540B are shown in the context of systems 1100, 1200, and 1300, for example. In accordance with example implementations, mixture 12 can be provided to assembly 540A. In reference specifically to FIG. 19, assembly 540A can have one or more membranes, and assembly 540B can have one or more membranes. As shown, assembly 540A can provide a retentate mixture 1018A that can proceed to optional assembly 540B while also providing a permeate mixture 1020A. Alternatively, mixture 1018A can be provided to other points of a separation and purification system as appropriate. Permeate mixture 1020A can have a percentage of carbon dioxide from about 60% to about 70%. In accordance with example implementations, the stages can be operated at different configurations to provide a yield of carbon dioxide that is greater than 90%, for example, as well as a purity of the carbon dioxide exiting the system that can be as high as 70%. When included, assembly 540B can provide retentate mixture 1018B and permeate mixture 1020B.

In accordance with another example implementation, vacuum pump 600 can be provided. Vacuum pump 600 can provide a pressure differential to facilitate permeate mixture 1020A production. Accordingly, operating the removal of the permeate mixture from the membrane assembly under reduced pressure can provide additional yield and/or purity of the carbon dioxide in the permeate mixture.

Referring next to FIG. 20, again with a different configuration, multiple membrane assemblies 540A and 540B are provided. In accordance with an example implementation, assembly 540A can include one or more membranes, and assembly 540B can include one or more membranes. Mixture 1020B can be provided together with mixture 12 as enriched mixture 1700 to assembly 540A and pressurized at compressor 400. In accordance with example implementations, mixture 1700 can have a higher concentration of carbon dioxide than mixture 12. In accordance with this configuration, the carbon dioxide yield may increase to as high as 90% and the carbon dioxide can be maintained at a purity of greater than 70%.

Referring next to FIG. 21, another configuration includes assemblies 540A and 540B with assembly 540B receiving permeate mixture 1020A. The assemblies can have mixtures provided under pressure with compressors 400 and 420 as shown.

In accordance with example implementations and with reference to the above FIGURES, the present disclosure provides membrane separation technology that can be used as part of the carbon dioxide separation systems and alternative systems, including but not limited to that in U.S. Patent Application Publication No. US 2020/0340665 which was published Oct. 29, 2020, the entirety of which is incorporated by reference herein.

Referring next to FIG. 22, in another series of components of the present disclosure, the >95% pure $CO_2$ 78 can be cooled and compressed in sequential steps as shown in heat exchangers 104, compressors 106 and 108, and heat exchanger 110 with compressors operatively engaged with cooling transfer fluid 90 to approach the phase change state for liquefaction. In accordance with example implementations, the >95% pure $CO_2$ can have a temperature coming out of the PSA of as high as 100° C. As described, a heat exchanger can be provided to lower the temperature of the gas to a sufficient temperature and then compress the gas to a higher pressure. In accordance with example implementations, heat removed from this $CO_2$ stream can be transferred through external water/glycol cooling loops back to a heat management system which will support preheating of makeup water as shown in FIG. 22. It can also be provided to raise the temperature of nitrogen gas coming off of the PSA prior to expansion through the turbine. This can improve turbine efficiency by allowing full use of nitrogen flow before exceeding the COLD temperature output limit. This is just one of several examples of utilizing heat from system components at other portions of the system to derive a more efficient overall system. In accordance with FIG. 23, there is a stepwise cooling and compression sequence of the $CO_2$ gas, which drives towards a final state of 311 psig and 0° F., at which point phase change occurs and the $CO_2$ becomes a liquid.

Referring next to FIG. 23, a $CO_2$ liquefaction and storage system and/or method is shown wherein $CO_2$ gas 112 is sparged inside a vessel 113 such as an insulated vessel. Example insulated vessels can include but are not limited to vacuum jacketed liquid storage tanks. Within this vessel, gas 112 can be converted to a liquid 114. In accordance with example implementations, gas 112 can be provided to sparge assembly 118 where it is provided as sparged gas 120 which liquefies upon sparging into liquid 114.

Vapor 116 at the top of vessel 113 is managed by a refrigeration system 122 which cools vapor 116, which condenses back to liquid 114, which returns back into vessel 113. In accordance with example configurations, system 122 can be configured as a loop in fluid communication with vessel 113 wherein vapor $CO_2$ 116 enters system 122 and returns to vessel 113 as a liquid $CO_2$ 114. In at least one configuration, system 122 is configured as a low temperature condenser equipped with an evaporator.

In accordance with an additional embodiment, vessel 113 can be configured with a controlled venting subsystem to facilitate removal of non-condensable gases while minimizing loss of $CO_2$. Inlet gas to the $CO_2$ liquefaction system can be a high concentration of $CO_2$ preferably >95%. Remaining gases, such as nitrogen and oxygen, can be considered as non-condensable gases in the liquefaction process. In addition, a very small subset of impurity gases remain which are miscible with liquid $CO_2$. These impurities must be measured accurately in order to qualify the liquid $CO_2$ product in accordance with commercial standards, such as ISBT, the international beverage guideline. Both the controlled venting subsystem and the purity analytical system can account for non-condensable gases which can dissolve into the liquid.

Without preprocessing by a distillation tower, non-condensable gases in the continuous feed to liquefaction can build up in the storage system vapor space 116. Without removal, these non-condensable gases can continue to build pressure in the vapor space of the storage tank causing some of the gas to dissolve into the liquid, thus contaminating the liquid. In addition, excessive pressure in the tank can inhibit both the gas feed system and the refrigeration system which manages vapor and re-condenses $CO_2$ as liquid back into the tank. The venting system can be controlled to manage tank vapor space in conjunction with the refrigeration unit to release non-condensable gases, reduce pressure buildup, while minimizing loss of $CO_2$ vapor. Instrumentation (see for example, FIG. 11) at the tank can be configured to acquire and provide data regarding vapor pressure, dissolved gas, vapor composition, gas flow, etc. to the processor which can operate solenoid valves on vent lines to enact controlled release of tank vapor within strict parameters.

In the event of building power loss, the superior insulation of a vacuum jacketed tank, for example, may maintain liquid $CO_2$ for at least 30 days. In accordance with example implementations, the building itself may be able to tap into vessel 113 for a supply of $CO_2$ to extinguish fires; for example, fires related to electronic components that require $CO_2$ extinguishing methods.

With reference to the FIGS. and in accordance with other example implementations, a $CO_2$ removal and/or delivery system is provided that can include off-take management using one or more vehicles provided in concert with $CO_2$ removal and/or delivery needs as provided by system control. For example, a removal and/or delivery truck 200 can be provided which transfers $CO_2$ directly from vessel 113 via a transfer pump 202 into a liquid $CO_2$ tank affixed to truck 200. The system can be configured to generate $CO_2$ pick up times based on numerous parameters, such as: vessel 113 capacity, system 10 $CO_2$ generation, legal date/time pickup windows; and/or $CO_2$ delivery needs. With respect to $CO_2$ delivery needs, it is contemplated that such high purity $CO_2$ can be delivered to a user directly without being warehoused or the need for additional purification. Just one example of direct delivery can be delivery to a wastewater treatment plant. In any case, however, offtake analytics can be provided to qualify the product with the ability to issue a Certificate of Analysis before transport.

Referring next to FIG. 24, plant, process and field level components of a control system are shown. In accordance with an example implementation, an example overall control system is provided that shows combustion emission and control, MASTER PLC controller, the diverter, the compression, dryer, separation, cooling and compression, refrigeration/storage, and the providing of food grade $CO_2$. These systems are also coupled to utility systems of electricity, natural gas, and water. These control systems exemplify a basic Network Architecture Diagram. The MASTER PLC controls the entire plant with Ethernet loop connections and with Internet IP protocol communications to the Local Packaged controllers, and through direct connection and control to the digital and analog 1/O field instrumentation level. The HMI server gathers data from the MASTER PLC, manages plant real time displays, executes logging, data management applications, and communicates through the secure firewall to external users. Also implied is the Engineering Development workstation which maintains all operational software and updates which are periodically downloaded to the MASTER PLC.

Referring to FIGS. 25A and 25B, an example implementation of the systems and/or methods is disclosed which details the sequence of the different components and processes described herein, as well as additional thermal management components that are associated with the building. As can be seen throughout the Figures and accompanying description, there are multiple places for heat to be transferred from different components of the disclosed system to existing building systems. For example, as shown, chillers can be in the building, as well as existing cooling towers. These active cooling components can be operably coupled with heat being removed from process components via individual cooling loops. In accordance with example implementations heat, sometimes referred to as waste heat, can be transferred to building systems which can use extra heat to operate more efficiently. Therefore, regarding waste heat from the disclosed system, design preference is to transfer waste heat, firstly to building steam and hot water makeup systems, secondly to the building cooling tower, and finally to an appropriate chiller with heat exchange to air.

As shown in FIGS. 24 and 25A-B, a thermal management system (see, e.g., MASTER PLC, controllers, etc.) can conserve use of fuel such as natural gas in the boiler by optimizing the combustion with the combustion controller, control water removal from the flue gas with the front end controller, perform additional separation with the dryer and PSA with the separation controller, liquefy and store $CO_2$ with the liquefaction/storage controller, and dictate off-take to a pickup and/or delivery truck with the off-take controller. These and additional controllers can work to control boiler feed water, potable and/or industrial water, chiller water, and/or cooling tower water, as well as nitrogen expansion cooling to reduce and/or eliminate heat loads in the system. Accordingly, flue gas can be cooled for water knockout, and heat generating electrical components such as compressors, blowers, pumps, and fans can be cooled as well.

Additionally, localized gas analytic instruments can be configured to provide localized $CO_2$ and $O_2$ concentration measurements in near real time. By locating gas sampling instruments/sensors directly at sampling points within subsystems like the PSA subsystem, small streams of sample gas can be pumped through sensor caps just inches away from the process gas to be measured. This innovation provides near instantaneous measurements at sub second sampling rates from multiple devices simultaneously. Each measurement device can be configured to prepare and format data for immediate transmission to the master controller using standard communication protocols. Individual sensor devices can be uniquely addressed by the master controller over a common hardwire connection (ethernet, RS232, RS485, etc.).

As indicated above, in order to meet commercial requirements for transporting and marketing liquid $CO_2$, off-take analytics can be provided that are integrated into the system in order to certify off-take weight of liquid $CO_2$ removed, and to qualify $CO_2$ product purity within required commercial standards. This off-take analytical system can be configured to issue a Certificate of Analysis for the product $CO_2$ at the time it is transferred out of the building, or from an intermediate storage and processing facility. In addition, the off-take analytical system can be configured to document all information to officially account for all off-take transactions.

In accordance with an example implementation, a set of electronic load cells can be placed underneath each storage tank to accurately measure weight of the tank and its contents. The system will make a difference calculation to certify weight of liquid $CO_2$ removed.

In accordance with another implementation, the analytical system can be configured to measure product impurities within exacting standards. Just before product transfer the analytical system will automatically take a small liquid $CO_2$ sample from the storage tank, vaporize it, and then flow the sample gas to a state of the art FTIR spectrum analyzer or to a field grade gas chromatograph system. The FTIR spectrum analyzer will be equipped with procedures and chemical spectral libraries sufficient to identify and measure all "impurities" shown on the customers contractual purity specification for liquid $CO_2$. Such specifications usually stipulate the ISBT beverage guideline along with one or more additional compounds of importance to the customer. At least one advantage of the FTIR analytical system is that it will be configured to operate automatically, not requiring manual assistance, while providing several times more measurement fidelity than required by the ISBT guideline. It is generally understood that FTIR systems cannot measure chemical compounds which do not exhibit a molecular dipole. This does not apply to impurities of interest, since they all exhibit molecular dipoles, with several degrees of motion (observable frequencies).

Additionally, in a separate embodiment the FTIR system can also be connected to the "front end" to accurately measure impurities of flue gas from the boiler system.

In accordance with example implementations, the systems and/or methods of the present disclosure can include an energy storage system that can be configured to include a power conversion component and/or a battery or battery bank component. As one example, energy can be generated via turbine expansion of the nitrogen and this energy can be converted and stored within the building. The energy may be converted and provided directly to system components, for example compressors, and/or provided to the system components after storage, thus lowering building energy demand. Additionally, the energy may be provided to the power grid associated with the building itself.

In accordance with example implementations, using the MASTER PLC, energy generated with the system can be utilized during "peak demand" times (when, for example electricity rates are higher) and/or when the building is utilizing a "peak" amount of power. During these times, the MASTER PLC is monitoring building demand and then modify the system parameters to efficiently use energy storage and/or change carbon dioxide separation, liquefaction, storage, and/or transport to lower energy consumption during "peak demand" thus providing energy cost savings.

Example implementations of the systems and/or methods of the present disclosure can provide not only a carbon capture system but also an improvement in overall building energy efficiency (both thermal and electrical) while lessening $CO_2$ emissions. Example implementations can include lowering carbon fuel consumption through optimizing boiler combustion, providing warmer boiler feed water thus requiring less energy to heat the boiler feed water, warming potable or process water thus requiring less energy to the heat the potable or process water, generating electrical energy and using same to power system components, and/or using building cooling towers to reduce building thermal load, etc., which individually and/or collectively can be part of systems that dramatically improve building efficiency.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for separating and liquifying $CO_2$ from flue gas, the method comprising:

removing water from the flue gas to form a flue gas stream comprising $CO_2$ and $N_2$, wherein the flue gas stream comprises from about 8% to about 16% $CO_2$, providing a flue gas stream comprising $CO_2$ and $N_2$ to a first membrane separation system to form a first $CO_2$-rich stream and a first $N_2$-rich stream;

providing the first $N_2$-rich stream to a second membrane system to form a second $CO_2$-rich stream and a second $N_2$-rich stream;

returning the second $CO_2$-rich stream to the first membrane separation system to fortify the first $CO_2$-rich stream; and liquifying the fortified $CO_2$-rich stream to form liquid $CO_2$.

2. The method of claim 1 further comprising removing water from the flue gas by compression and expansion of the flue gas.

3. The method of claim 1 further comprising removing water from the flue gas by cooling the flue gas.

4. The method of claim 1 further comprising removing water from the flue gas by drying the flue gas using an adsorbent.

5. The method of claim 1 further comprising liquifying the flue gas by heat exchange and compressive cooling.

6. The method of claim 1 further comprising storing the liquid $CO_2$.

7. The method of claim 1 further comprising transporting the liquid $CO_2$.

* * * * *